(12) United States Patent
Hartell et al.

(10) Patent No.: US 7,054,799 B1
(45) Date of Patent: May 30, 2006

(54) METHOD AND SYSTEM FOR REDUCTION OF A NETWORK TOPOLOGY-BASED SYSTEM HAVING AUTOMATED OPTIMIZATION FEATURES

(75) Inventors: Wayne R. Hartell, Waterbury, CT (US); Jack S. Cook, Jr., Bethlehem, CT (US); Robert F. Mankowski, Watertown, CT (US); Gregg A. Herrin, Burlington, CT (US); Zheng Y. Wu, Watertown, CT (US)

(73) Assignee: Haestad Methods, Inc., Watebury, CT (US)

( * ) Notice: Subject to any disclaimer, the term of this patent is extended or adjusted under 35 U.S.C. 154(b) by 751 days.

(21) Appl. No.: 10/190,651

(22) Filed: Jul. 8, 2002

(51) Int. Cl.
*G06F 7/60* (2006.01)
*G06F 17/10* (2006.01)

(52) U.S. Cl. .......................................................... 703/2
(58) Field of Classification Search ...................... 703/2
See application file for complete search history.

(56) References Cited

U.S. PATENT DOCUMENTS

| | | | |
|---|---|---|---|
| 5,511,188 A | 4/1996 | Pascucci et al. | |
| 5,758,347 A | 5/1998 | Lo et al. | |
| 5,787,283 A | 7/1998 | Chin et al. | |
| 6,119,125 A | 9/2000 | Gloudeman et al. | |
| 6,247,019 B1 | 6/2001 | Davies | |
| 2003/0093236 A1 | 5/2003 | Wu et al. | |

OTHER PUBLICATIONS

Automated Skeletonization Techniques; authorship not listed; Produced by Haestad Methods, Inc. and obtained from assignee's website; pp. 1-11; Apr. 2002.*
Boulos, Paul P. and Don J. Wood, Explicit Calculation of Pipe-Network Parameters, Journal of Hydraulic Engineering, vol. 116, No. 11, Nov., 1990, pp. 1329-1344.
Zheng Y. Wu et al., Using Genetic Algorithms to Rehabilitate Distribution Systems Journal AWWA, Nov. 2001, all pages, pp. 74-85.

(Continued)

*Primary Examiner*—Hugh Jones
(74) *Attorney, Agent, or Firm*—Cesari and McKenna LLP

(57) ABSTRACT

A method and system for reduction of a network topology-based system having automated optimization features is provided. The method allows for skeletonization to be performed by one or more desired processes including Data Scrubbing, Parallel and Series Pipe Removal techniques, and Branch Trimming techniques. The Data Scrubbing technique includes a loop retaining sensitivity setting that allows the user to determine how large the hydraulic loops are that remain in the system. The data scrubbing technique also includes a network-walking feature in which the software will check each element, when desired, and determine whether it is safe to remove that element without affecting the topological and hydraulic connectivity of the engineering model being reduced. The feature also includes a genetic algorithm-based feature that allows for hydraulics or system behavior to be reintroduced into the model, which may have been eliminated when the elements that gave rise to those effects were removed using the data scrubbing skeletonization technique.

24 Claims, 23 Drawing Sheets

OTHER PUBLICATIONS

Wu, Zheng, Optimal Capacity Design of Water Distribution Systems, ASCE Annual Environmental and Water Resources System Analysis (EWRSA) Symposium, May 19-22, 2002, Roanoke, VA.

Walski, Thomas M. et al., "Skeletonization", Advanced Water Distribution Modeling and Management: First Edition, 2003-2004, Section 3.11, pp. 112-125, Haestad Methods, Inc., Waterbury, CT.

Walski, Thomas M. et al., Wastewater Collection System Modeling and Design: First Edition, 2004, Haestad Methods, Inc., Waterbury, CT.

* cited by examiner

Non Removable Elements Manager – Pipes

Removable Elements: — 1002

| Pipes | Diameter (ft) |
|---|---|
| P-2506 | 0.50 |
| P-2507 | 0.67 |
| P-2508 | 0.67 |
| P-2509 | 1.00 |
| P-2510 | 0.50 |
| P-2511 | 0.67 |
| P-2512 | 0.50 |
| P-2513 | 0.50 |
| P-2515 | 0.67 |
| P-2517 | 0.50 |
| P-2519 | 1.00 |
| P-2520 | 0.50 |
| P-2521 | 0.67 |
| P-2522 | 1.33 |
| P-129 | 0.83 |
| P-2523 | 0.67 |

Non Removable Elements: — 1004

| Pipes | Diameter (ft) |
|---|---|
| P-373 | 0.50 |
| P-1093 | 1.00 |
| P-1098 | 0.50 |
| P-1961 | 0.50 |
| P-1964 | 0.50 |
| P-2514 | 0.83 |
| P-2516 | 0.67 |
| P-2518 | 0.67 |

>
>>
<
<<

OK   Cancel   Help

METHOD AND SYSTEM FOR REDUCTION OF A NETWORK TOPOLOGY-BASED SYSTEM HAVING AUTOMATED OPTIMIZATION FEATURES

BACKGROUND OF THE INVENTION

1. Field of the Invention

This invention relates to software for the design and construction of engineering system models, and more particularly to reduction of a network topology-based system and the calibration of such a system.

2. Background Information

In many civil engineering applications, it is important to have predictive simulations for conditions for networks providing the infrastructure for a community. The simulations are used to design new portions of a civil engineering system, to rehabilitate aging sections of the civil engineering system or to perform vulnerability studies to produce risk assessments for security or other matters that may be presented which could affect the infrastructure being represented. Such simulations are performed using software that generates an engineering model of the system. An engineering model is employed for these purposes and it uses data describing field conditions, which data is assembled in a systematic manner to describe the system. For example, in a water distribution model, field conditions are assembled in a systematic manner to describe pipe flow and junction hydraulic grade lines (HGL) (which are pressures) within a water network being described by a water distribution model. The model is desirably capable of simulating conditions encountered at the site.

Models can employ a large amount of data. In many instances, all of the data is not needed to develop an understanding of the system, to perform a particular set of analyses or to produce a particular set of results for the engineering system. Thus, sometimes a portion of the data is eliminated from the model and a simpler model, involving fewer elements, is developed. This reduction process is sometimes referred to as "skeletonization" of the model. The skeletonization of a model which includes many elements develops a more compact representation of the system. There may be a target that an engineer would like to achieve, such as producing a model with 1000 pipes in a hydraulic network model, when the overall actual system includes 10,000 pipes, for example.

Several skeletonization processes have been known in the art. These processes may have conditional criteria depending upon the particular circumstances. Some topological processes involve Series Pipe and Parallel Pipe Removal whereby certain elements are combined and represented by only one pipe, for example. Branch Trimming is another method of skeletonizing a model. Another process is Data Scrubbing, in which there is a more random, blind removal of data.

Series Pipe Removal combines two pipe elements into one while the intermediate node, sometimes possessing hydraulic demand, is removed. Demand, if present on the intermediate node is reallocated in some fashion to the end nodes of the merged pipe. Demand reallocation strategies, however, typically are not comprehensive enough and limit the user to choosing from an even demand distribution or a distance weighted one. This limitation can hinder the ability to maintain an acceptable level of hydraulic parity.

Additionally, difficulty can be encountered with Series Pipe Removal in maintaining the accuracy of the representation of the system behavior in the reduced model. If the pipes to be merged have dissimilar hydraulic characteristics (roughness, diameter etc.) then the resulting pipe will not be an hydraulically equivalent representation of the original system. To combat this, current processes employ a criteria-based process, but this process can lead to fewer elements being removed during the skeletonization because the values of the potential merger candidates must usually match exactly. It would be helpful if the user could specify tolerances that determine if pipes to be merged are similar enough that combining them into a single pipe will not significantly impact the hydraulic behavior of the modeled network, as opposed to requiring values to match. Additionally, criteria and tolerances imposed on the pipe end nodes can serve as a protection against losing certain hydraulic data. For example, the user may only wish to merge two pipes if their end nodes do not vary in elevation by more than 3 feet, otherwise a loss of important pressure information may result. Up to now, the user has not usually had this level of flexibility with currently available techniques.

Parallel Pipe Removal is a process of combining pipes that share the same two end nodes. It has disadvantages similar to those of Series Pipe Removal.

Branch Trimming is another common process of removing pipes in a network for skeletonization purposes. Branch Trimming is the process of removing short, dead end links and corresponding junctions. As for Series Pipe Removal pipes and junctions (nodes) are removed by this process, thus criteria for both types of elements are specified by the user. Once again, existing tools are limited to a narrow range of criteria, usually pipe length and node elevation tolerances.

One aspect of Branch Trimming is the reallocation of demands that are associated with junctions that are removed. The demand associated with the dead end junction is assigned to the junction at the beginning of the branch. Branch Trimming is typically an effective skeletonization technique because dead end junctions with no loading have little effect on a model, and dead end junctions that do have demands are accounted for at the point through which the flow would pass without skeletonization. So, the hydraulic behavior of the network as a whole is not adversely affected. However, the disadvantage to this type of skeletonization is that information and results can not be obtained from non-existent elements, thus during water quality or fire flow analysis, information on trimmed elements may be desired, but may now be unavailable after model reduction.

The fourth type of skeletonization is that of data scrubbing. Data scrubbing is typically the simplest and generally the first step of the skeletonization process, especially for models that contain many small or insignificant elements. Some automated skeletonizers rely entirely on data scrubbing reduction techniques. Data scrubbing basically consists of simply removing all pipes that meet user-specified criteria such as diameter, roughness or other attributes. Criteria combinations can also be applied such as, "remove all two inch pipes that are less than 200 feet in length."

The data scubbing type of skeletonization is especially useful when the model has been created in a Geographic Information System (GIS) environment. GIS maps generally contain much more information than is necessary for the hydraulic model. Examples of elements that are commonly included in GIS maps, but not necessarily in the distribution model, are service connections and isolation valves. Removing these elements generally has negligible impact on the accuracy of the model, depending upon the application for which the model is being used. The primary disadvantage of this type of skeletonization is that system integrity may not be maintained because there is typically no network awareness involved and little consideration of the hydraulic effect of the removal of an element. Thus, there is a potential for error through inadvertent pipe removal or by causing network disconnection. Most conventional skeletonization techniques do not include the ability of the user to specify that certain elements cannot be removed.

Of the four skeletonization methods discussed, each of these techniques can lose some of the information about network behavior that ideally would be included in the model. There remains a need therefore for a skeletonization tool that maintains system integrity while allowing for removal of elements according to flexible modeling criteria, while preserving the hydraulic behavior of the model.

Applying generally to the techniques of Branch Trimming, Series Pipe Removal and Parallel Pipe Removal, it is an object of the present invention to provide a method and system for skeletonization of an engineering modeling system that can employ a variety of user-specified skeletonization techniques with user-specified criteria and tolerances, while maintaining greater accuracy and predictability for the simulation of the actual engineering system being modeled.

The Data Scrubbing process, however, is unique in that it is more destructive than the other three methods and requires an alternative approach to re-introduce the hydraulics of a water distribution network model into a skeletonized model to more accurately represent system behavior. Thus, it is a further object of the present invention to provide a modeling system that maintains system integrity and allows for reduction in the number of elements in the model that achieves the goals of reducing a model for the skeletonization technique of Data Scrubbing. In addition the method used to re-instate the hydraulics after performing the data scrubbing process, can also apply to the other three skeletonization processes such that it provides a more accurate correlation between previous and new hydraulics where multiple demand conditions are present in the pre-skeletonized model.

SUMMARY OF THE INVENTION

The disadvantages of prior techniques have been overcome by the present invention, which provides an automatic model reduction and skeletonization process that maintains system integrity through consistent network topology and equivalent pipe techniques and includes user-specified criteria and tolerances to allow customization of the skeletonization process by the user. The reduction in the number of elements utilized by the model is performed using multiple skeletonization techniques and particularly, data scrubbing which is enhanced by a network integrity preservation algorithm that includes a loop sensitivity heuristic that can be user-defined. The data scrubbing process also includes a genetic algorithm-based calibration program that is run to re-instate the network behavior and to optimize that behavior, such as the hydraulics, to the reduced model.

The user has the capability of setting criteria and tolerances for the skeletonization techniques, and for identifying certain elements as "non-removable." The calibration includes multiple parameters and corresponding boundary conditions that are taken into account to provide an accurate representation of the network at any instant in time. Briefly, the inventive system includes a software program that primarily includes four integral parts: a genetic algorithm module, a hydraulic simulation module, a skeletonization module, and a calibration module. These modules interact to provide an optimized solution for network modeling.

BRIEF DESCRIPTION OF THE DRAWINGS

The invention description below refers to the accompanying drawings, of which:

FIG. 10 is a GUI of the non-removable elements manager-pipes, in accordance with the present invention (and a similar GUI exists for non-removable junctions);

DETAILED DESCRIPTION OF AN ILLUSTRATIVE EMBODIMENT

Figure 1:
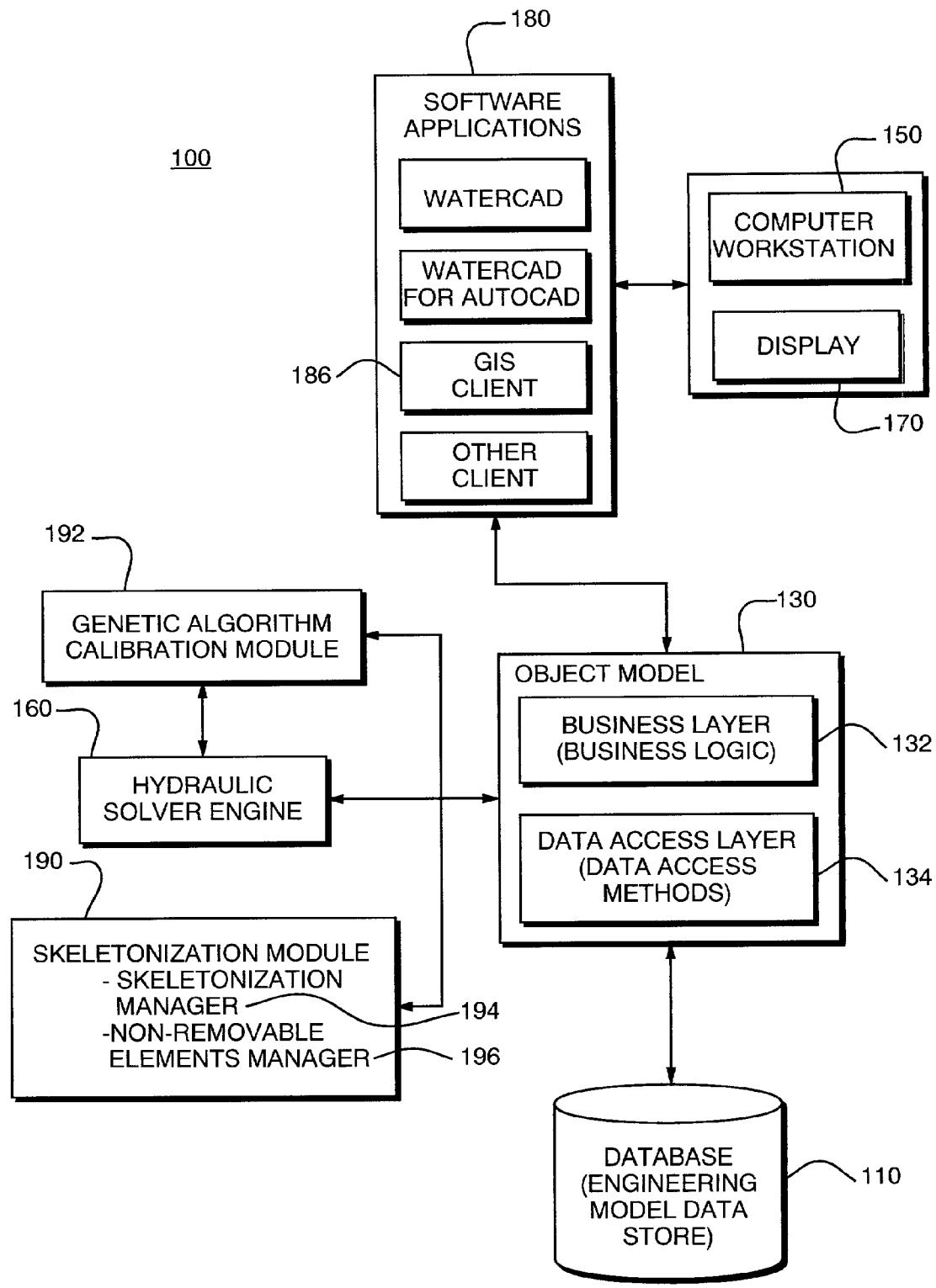
FIG. 1 is a schematic block diagram of the modeling system incorporating the skeletonization and optimization features of the present invention.

The skeletonization and optimization system and method of the present invention are embodied in the system 100, which is schematically illustrated in FIG. 1. The system 100 includes the database 110, which includes tables and records that identify the elements of an engineering model. For purposes of clarity, this description is of an illustrative embodiment of the invention relating to a hydraulic water distribution network. It is within the scope of the present invention, however, that the features of the invention be applied to other types of engineering models, such as electrical grids, traffic or transportation models, and the like. Though not limiting to the invention, we have described herein the system and method of the present invention with respect to a hydraulic water distribution network.

An object model 130, which may be a COM (Component Object Model) based object model, is used for programmatic access to the data stored in database 110. Other software models could be readily employed while remaining within the scope of the present invention. Such an object model 130, via a business layer 132 and a data access layer 134 contains modules for programmers to use to manage the engineering model data. The skeletonization module 190 that comprises the skeletonization manager 194 and the non-removable elements manager 196 perform a number of functions in accordance with the present invention.

As discussed herein, the modeling engineer or programmer uses a workstation 150, such as a PC or other workstation to enter data or to make selections between options provided by the present invention. The entries made by the programmer at the workstation 150 along with the object model 130, are used by a hydraulic network solver engine 160, to produce an engineering model in accordance with the specifications selected by the user. Various GUIs, which are described hereinafter are displayed on display 170 in the form of graphs, charts and tables at the programmer's work station 150, or at an end user's terminal 170 via the Internet or other connection to the hydraulic network solver engine 160. The programmer's work station 150 can also be running various applications 180, such as a GIS client 186, used to generate the topological representation for the hydraulic network model, or other engineering model. The GIS software is used to display the model generated by the hydraulic network solver engine 160.

As will be understood by those skilled in the art, and as described herein, engineering modelers can choose to model an entire engineering system in which case the model contains every element, including links and nodes in the system. In many cases, however, the engineering modeler will prefer to use a more simple model for the purposes of analysis, prediction or risk assessment. A number of factors go in to the engineering modeler's decision about the extent to which the model should be simplified. The simplification of the model involves reduction of the number of elements and thus the data that is included in the model. As noted, the process of reduction of the number of elements or data in a model is often referred to as skeletonization.

Figure 2A:
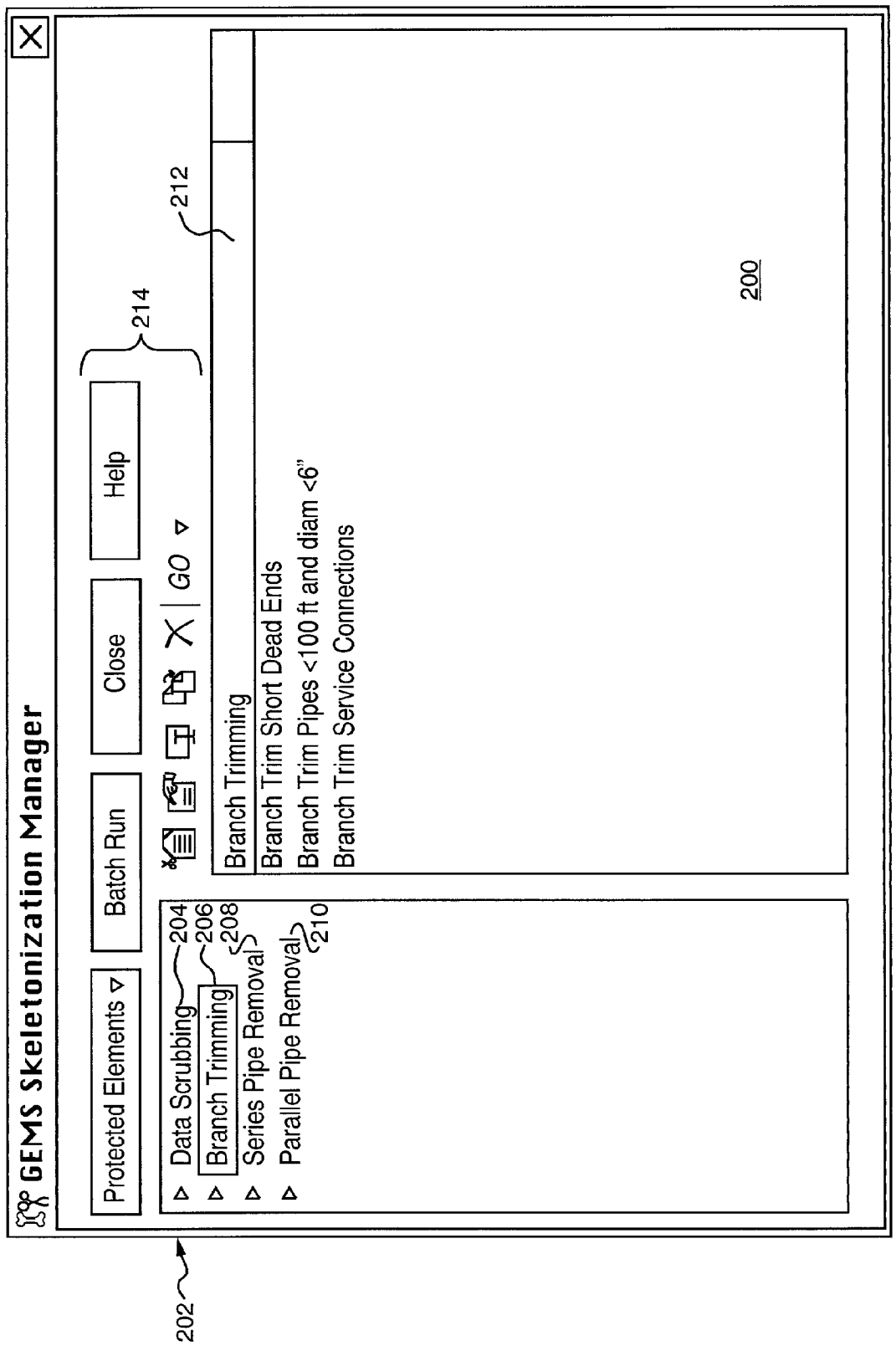
FIG. 2A is a graphic user interface (GUI) of the skeletonization manager of the present invention.

The object model 130 of the present invention interfaces with skeletonization module 190. The skeletonization manager is illustrated in a GUI 200 of FIG. 2A in accordance with the present invention. A skeletonization operation can be selected, and as described herein, the present invention includes four operations for skeletonization that may be used in a variety of ways. Those four skeletonization operations are shown in skeletonization manager 200 in the window 202, specifically: Data Scrubbing 204, Branch Trimming 206, Series Pipe Removal 208 and Parallel Pipe Removal 210. In the exemplary GUI 200, the skeletonizer operation selected is Branch Trim operation, as illustrated in the panel 212. The user is provided with a number of options as illustrated by the buttons that are designated collectively by the reference character 214.

In accordance with the invention, the user can run either one or more operations of the same type, for example Branch Trim Short Dead Ends, Branch Trim Pipes<100 ft and diam<6", or, alternatively, the end user may decide to run multiple operations of different types using a "batch run" feature, which is described herein. Batch running is a way to queue up a number of different processes of different types and run them sequentially. In this way, the user can customize a skeletonization process based on the model that is being reduced and the level of skeletonization that the user wishes to achieve in the particular application.

Figure 2B:
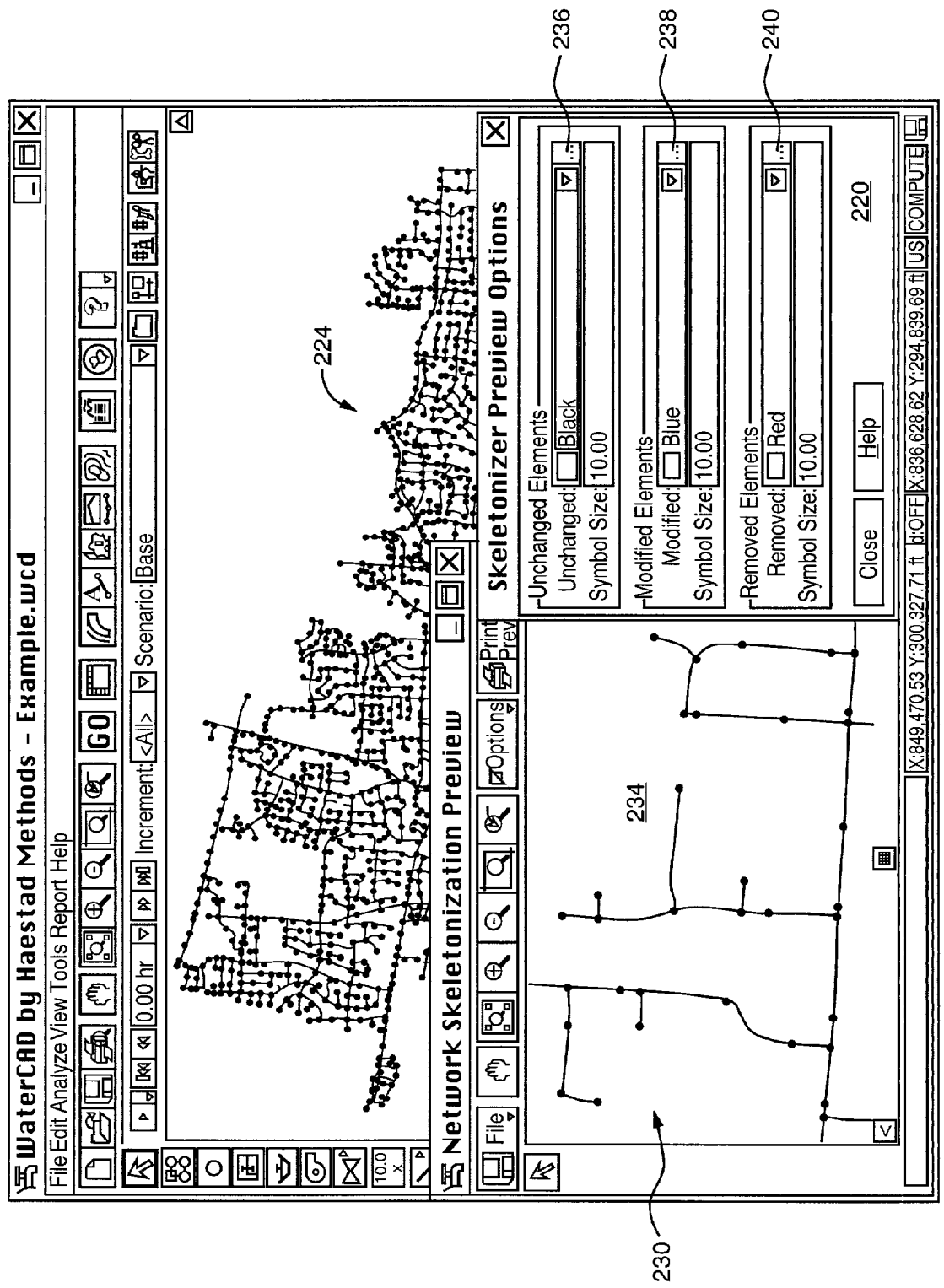
FIG. 2B is a GUI of the Preview feature of the present invention.

In accordance with another aspect of the invention that is illustrated in FIG. 2B, a preview feature allows a user to run any number of operations in a single form or a patch form and preview the results that could be achieved. This has the advantage of saving time as previews run more quickly than a full skeletonization by orders of magnitude and can provide the user with helpful information about the preferred customization of skeletonization operations in accordance with the present invention. As shown in GUI 220 of FIG. 2B, the original network 224 is to be subjected to a skeletonization process. A preview of the skeletonized network is illustrated in the window 230 as the simplified network 234, which may be color-coded in accordance with the selections made using the windows 236, 238 and 240.

Figure 3:
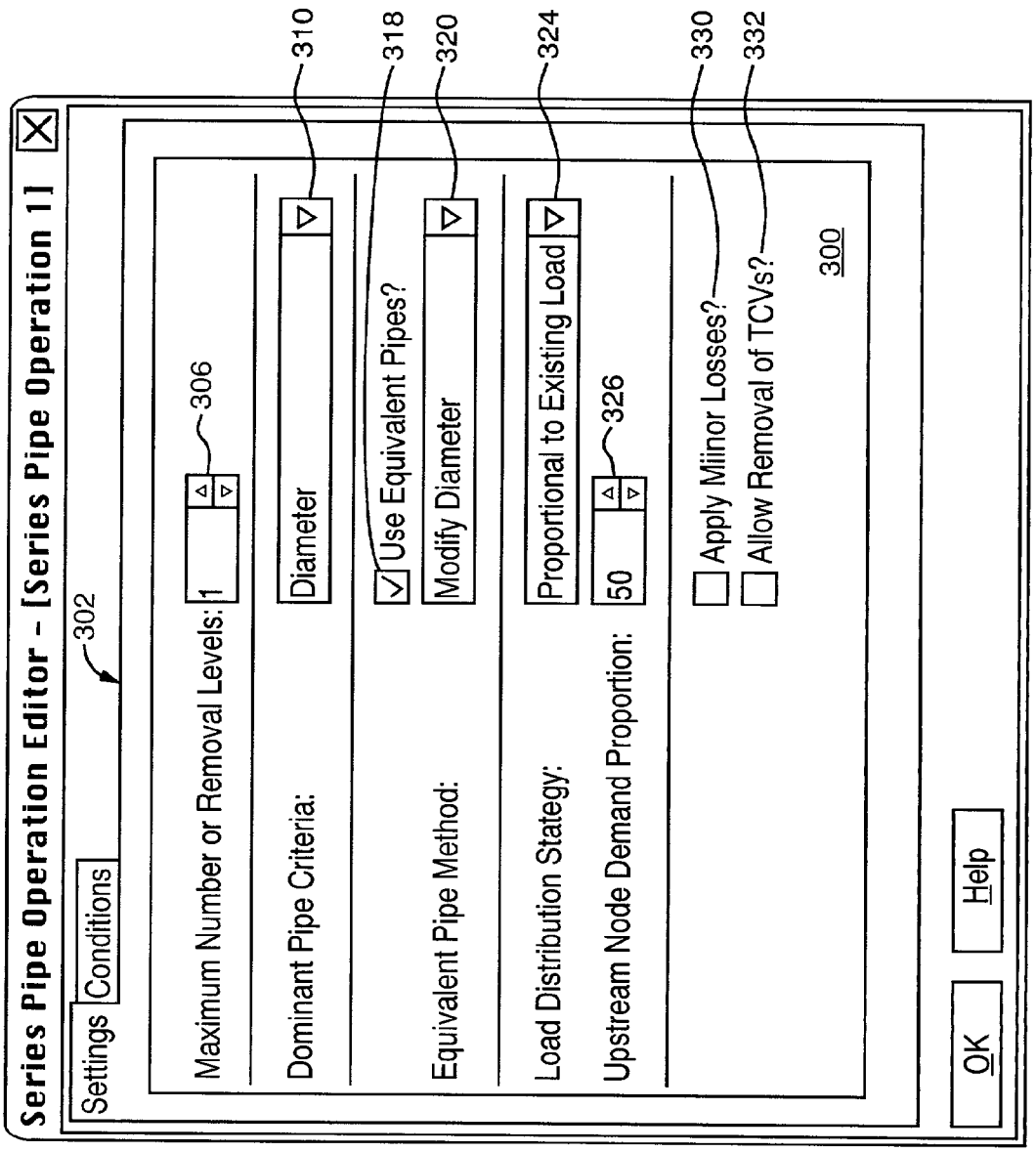
FIG. 3 is a GUI of the Series Pipe Removal operation editor of the present invention.

FIG. 3 illustrates the GUI 300, which is the operation editor dialog for a Series Pipe Removal operation. The settings on the Series Pipe Removal operation editor can be selected using the panel 302. The settings on the dialogs for each of the four operations will vary between operation types, as particular options will be exposed to the user that apply to the particular operation type. In the GUI 300, for example, the Series Pipe operation is limited by the maximum number of removal levels, 306, which in the example has been selected as 1. Removal levels represent the number of passes that the particular operation will make and this applies to Branch Trimming, Series Pipe Removal and Parallel Pipe Removal. In a single pass the algorithm builds a candidate list, and in the case of Series Pipe Removal the candidate list comprises pairs of pipes (i.e., the two pipes to be merged). On subsequent passes the algorithms generate new candidate lists based upon the results of the previous pass. Thus, achieving maximum skeletonization is an iterative process. If the maximum number of removal levels is set to a high value chances are that maximum skeletonization will be reached (no more valid candidates that satisfy all criteria and tolerances) before that number of levels is reached. This allows the skeletonization to be performed in an evenly distributed and controlled manner. The user has control over the number of passes that are made and thus over the degree or level of skeletonization performed. (It is noted that the reason levels do not apply to data scrubbing is that data scrubbing is typically completely performed in a single pass.) In this process, one pipe will be eliminated when a pipe element is combined with another pipe element, the system of the present invention allows for an equivalent pipe to be created to virtually represent the combination. This maintains the hydraulic behavior of the model, while reducing the amount of data included in the model.

More specifically, in accordance with the invention, the Series Pipe Removal techniques include a unique hydraulic equivalency feature that has been developed in accordance with the present invention. The feature works by determining the combination of pipe attributes that will most closely mimic the hydraulic behavior of the pipes to be merged. These attributes are applied to the newly merged pipe. By generating an equivalent pipe from two non-identical pipes, the number of possible removal candidates (and thus the potential level of skeletonization) is greatly increased.

The hydraulic equivalency feature allows a high degree of effective skeletonization, the goal of which is the removal of as many elements as possible without significantly impacting the accuracy of the model. This addresses the previous disadvantage described earlier, which is raised by skeletonization techniques that only allow exactly matched pipes to be merged by this process.

In accordance with the invention, the user has flexibility in deciding whether to use equivalent pipes, and how this is to be accomplished. For example, the dominant pipe criterion has been selected as pipe diameter, (other choices include Link, Roughness, Minor Loss Coefficient, Has Check Valve, Bulk Reaction Rate and Wall Reaction Rate), as illustrated in the window 310. Next, a check box 318 is used to determine whether the user wishes to use equivalent pipes, and if so, box 320 allows the user to select how to create equivalent pipes. In the illustrative case, equivalent pipes are to be created by modifying the diameter of the pipe. The other alternative is to modify roughness. In addition, as shown in FIG. 3, a load distribution strategy is selected as proportional to existing load, as shown in the window 324. Other choices for this setting include "Equally Distributed", "Proportional to Dominant Criteria" and "User Defined Ratio". If the user selected "User Defined Ratio" then upstream node demand proportion may be specified as illustrated in the window 326. Minor losses can be ignored in the process, if selected using the box 330. By selecting the box 332 the user indicates that Throttle Control Valves (TCVs) should be treated as if they were junctions. That is, they should be removed during the Series Pipe Removal process. This is an important feature for data sets that have been obtained through GIS or GIS related sources since those data sources typically tend to include redundant elements such as isolation valves. Isolation valves have been chosen as the example because they are generally modeled as TCVs in the hydraulic model, thus it is an object of the present invention to allow skeletonization of these elements. It is also within the scope of the present invention to skeletonize (or remove) other types of valves and nodes, using a similar process, and the invention is readily adaptable to include such additional functionality.

Figure 4:
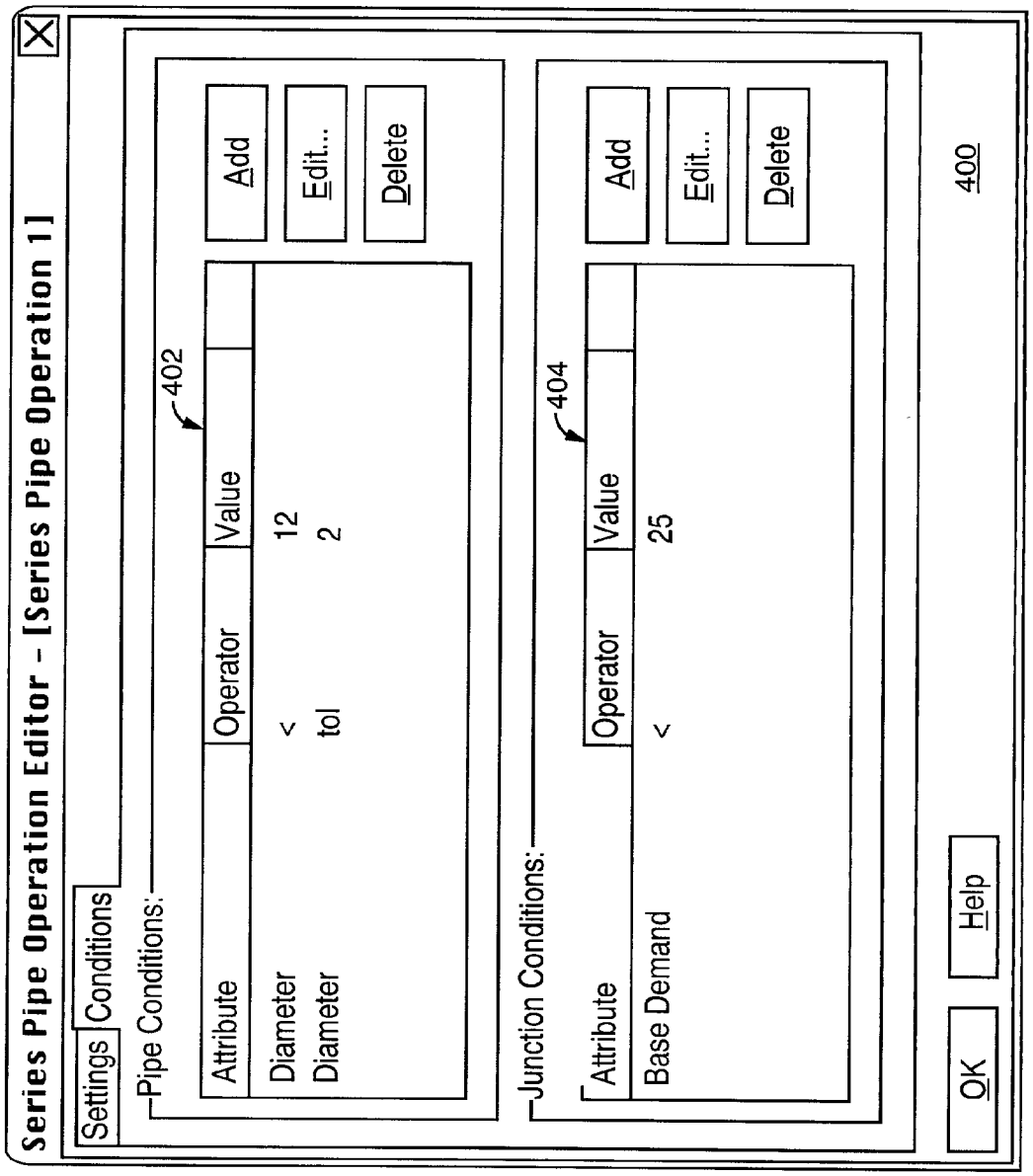
FIG. 4 is a GUI of the conditions tab of the Series Pipe Removal operations editor.

FIG. 4 is the GUI 400, which is a dialog associated with the Series Pipe Removal operations editor that provides the user options to set the conditions and tolerances for the pipe removal operation. In this case, the user can select pipe conditions using the window 402, or junction conditions using the window 404. This allows the user to specify that pipes within 2" diameter of each other, for example, can be merged.

Figure 5A:
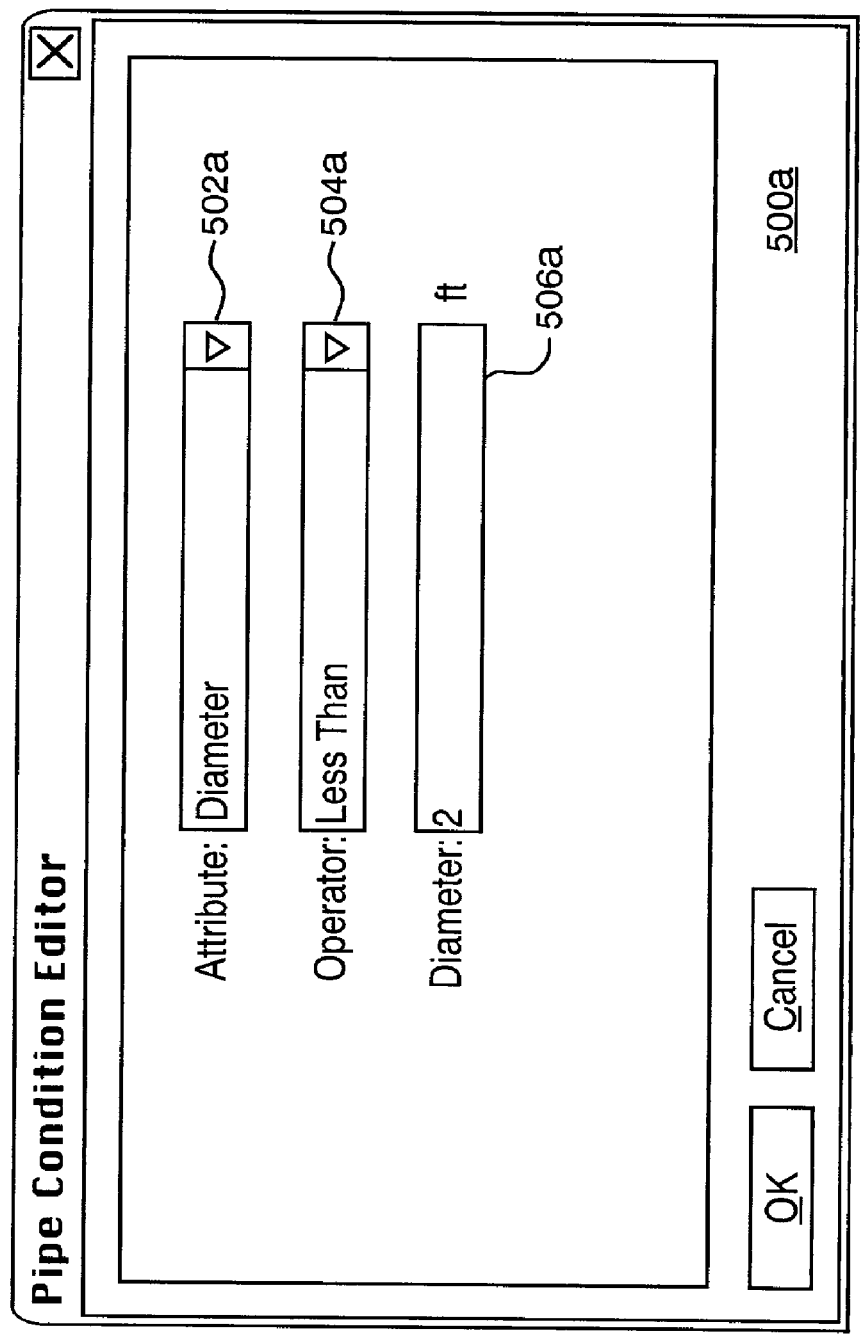
FIG. 5A is a GUI of the pipe condition editor.

More specifically, the conditions can be edited, using the pipe condition editor 500a of FIG. 5A. A pipe condition, such as diameter 502a, is selected. This condition is subjected to the selected operator of "less than" (504a) two feet (506a), which can be edited by the user through the dialog 500a. Using these selected conditions, the program of the present invention searches for all pipes of less than a two feet diameter and combines them subject to topology using the Series Pipe Removal techniques. Other conditions may include pipe roughness, pipe length, pipe minor loss coefficient, whether the pipe possesses a check valve, pipe bulk reaction rate and pipe wall reaction rate. Other conditions (not specifically mentioned herein) may also be specified for user selection, while remaining within the scope of the present invention.

Figure 5B:
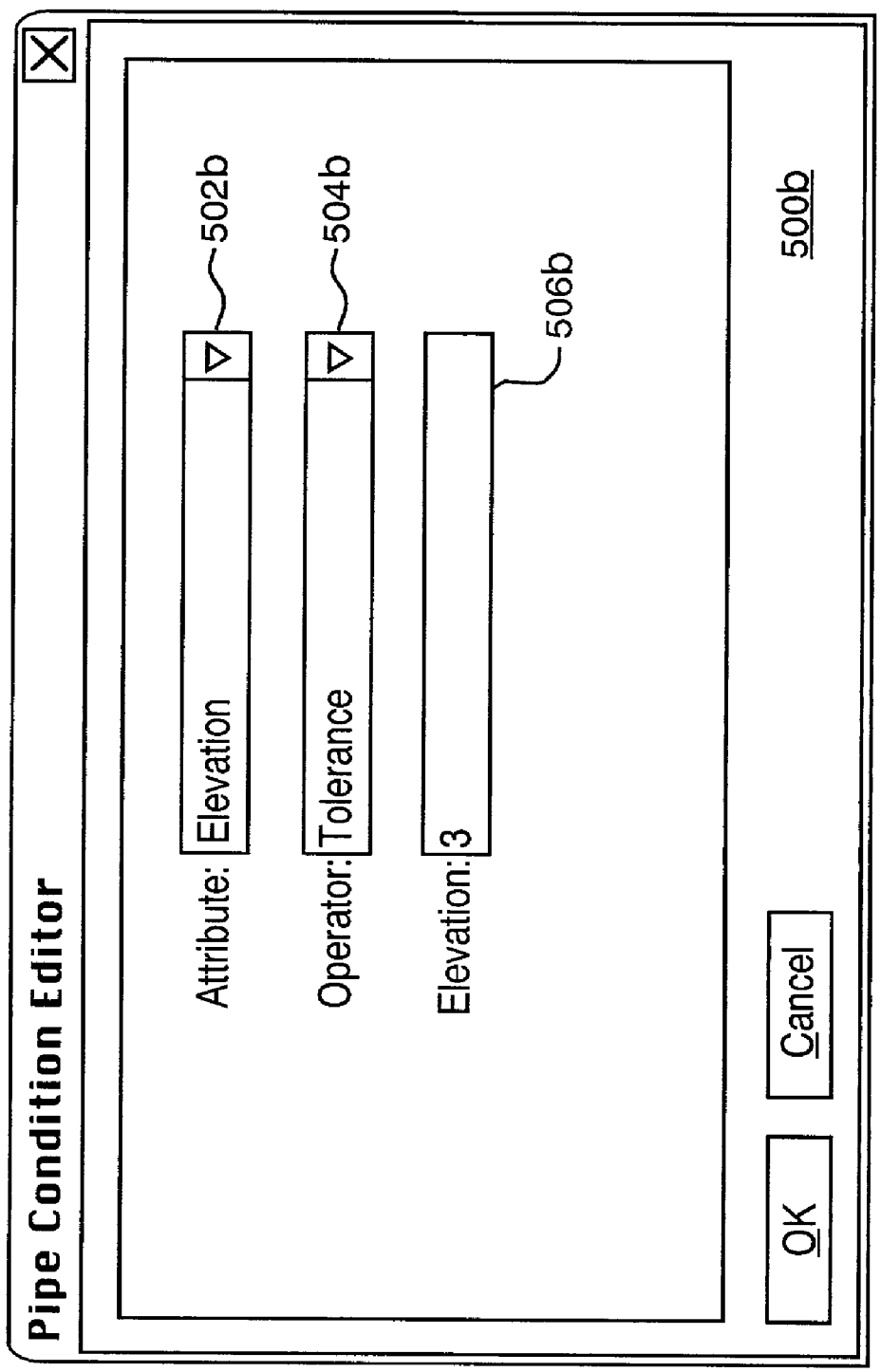
FIG. 5B is a GUI of the junction condition editor in accordance with the present invention.

A junction condition editor 500b, illustrated in FIG. 5B, allows the user to select an attribute 502b, such as elevation and an operator 504b, such as tolerance, for a particular elevation of, for example, three feet 506b. Thus series pipes with all of their end junctions residing within an elevation envelope of three feet or less can be combined.

Figure 6A:
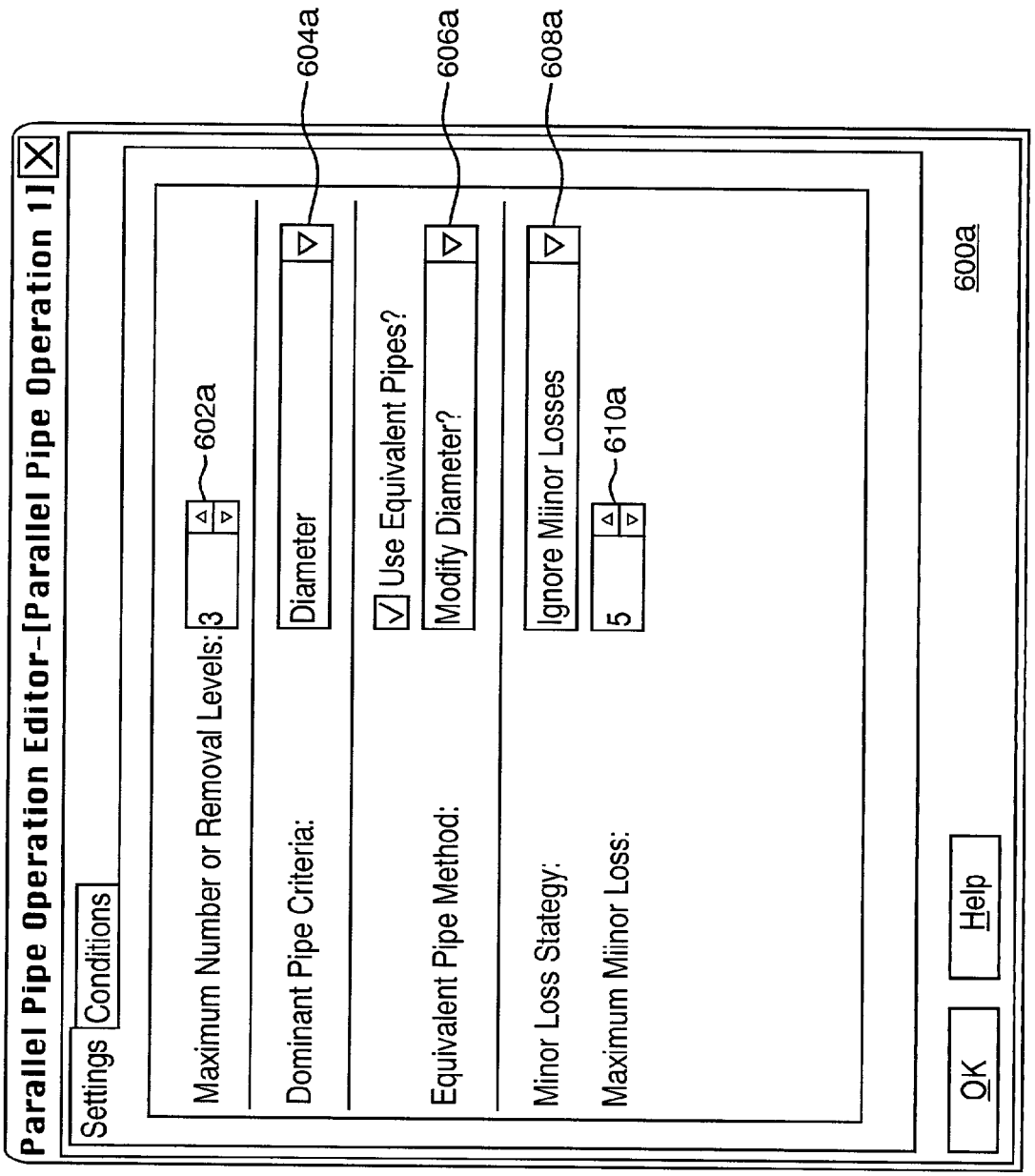
FIG. 6A is a GUI of the Parallel Pipe Removal editor of the present invention.

FIG. 6A illustrates the GUI 600a for the Parallel Pipe Removal editor. Parallel Pipe Removal is the process of combining pipes that share the same two end nodes into a single pipe. This skeletonization strategy also relies on the hydraulic equivalency feature of the present invention, as described with respect to Series Pipe Removal. First, a maximum number of removal levels is selected using the window 602a. Next, to merge parallel pipes, the end user specifies the criteria for determining which of the two pipes is the "dominant" one. In the example, diameter is selected to determine the dominant pipe. Other possible values are substantially the same as described for Series Pipe Removal. The user then selects whether to use the equivalent pipe technique and, if so, roughness value could have been used, if selected by the user, instead of diameter. The user specifies which of these two attributes to retain (diameter or roughness) and the system in accordance with the invention, determines what the value of the other attribute should be in order to maintain hydraulic equivalence, as shown in window 606a.

Figure 6B:
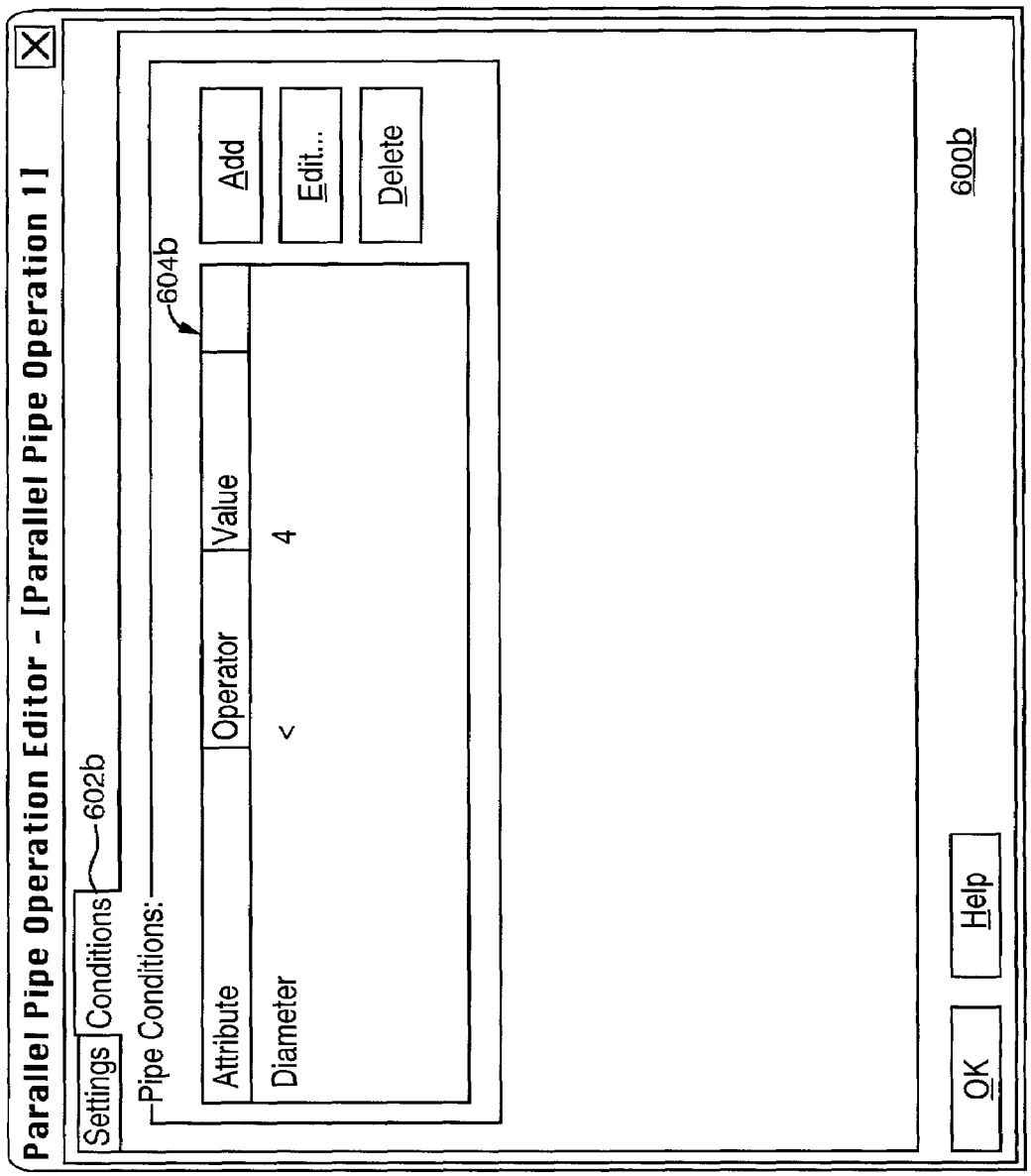
FIG. 6B is a GUI of the conditions tab of the Parallel Pipe Removal operation editor.

For example, the dominant pipe may have diameter of 10 inches and a C factor (a measurement of pipe roughness) of 120; one of these values is retained. The pipe that is removed has a diameter of 6 inches and a C factor of 120. The 10-inch diameter value pipe is retained, and the program performs a hydraulic equivalence calculation to determine the roughness of the new pipe in order to account for the additional carrying capacity of the parallel pipe that is being removed. This skeletonization method removes pipes and accounts for the effect of those pipes that are removed using the hydraulic equivalency method. Thus, network hydraulics remain intact while increasing the overall potential for a higher level of reduction. The user may also make selections in windows 608a and 610a concerning minor losses. The conditions tab 602b of FIG. 6B can be used to select which parallel pipes to combine. In the window 604b, the attribute is selected to be a diameter of less than 4 inches.

Figure 7A:
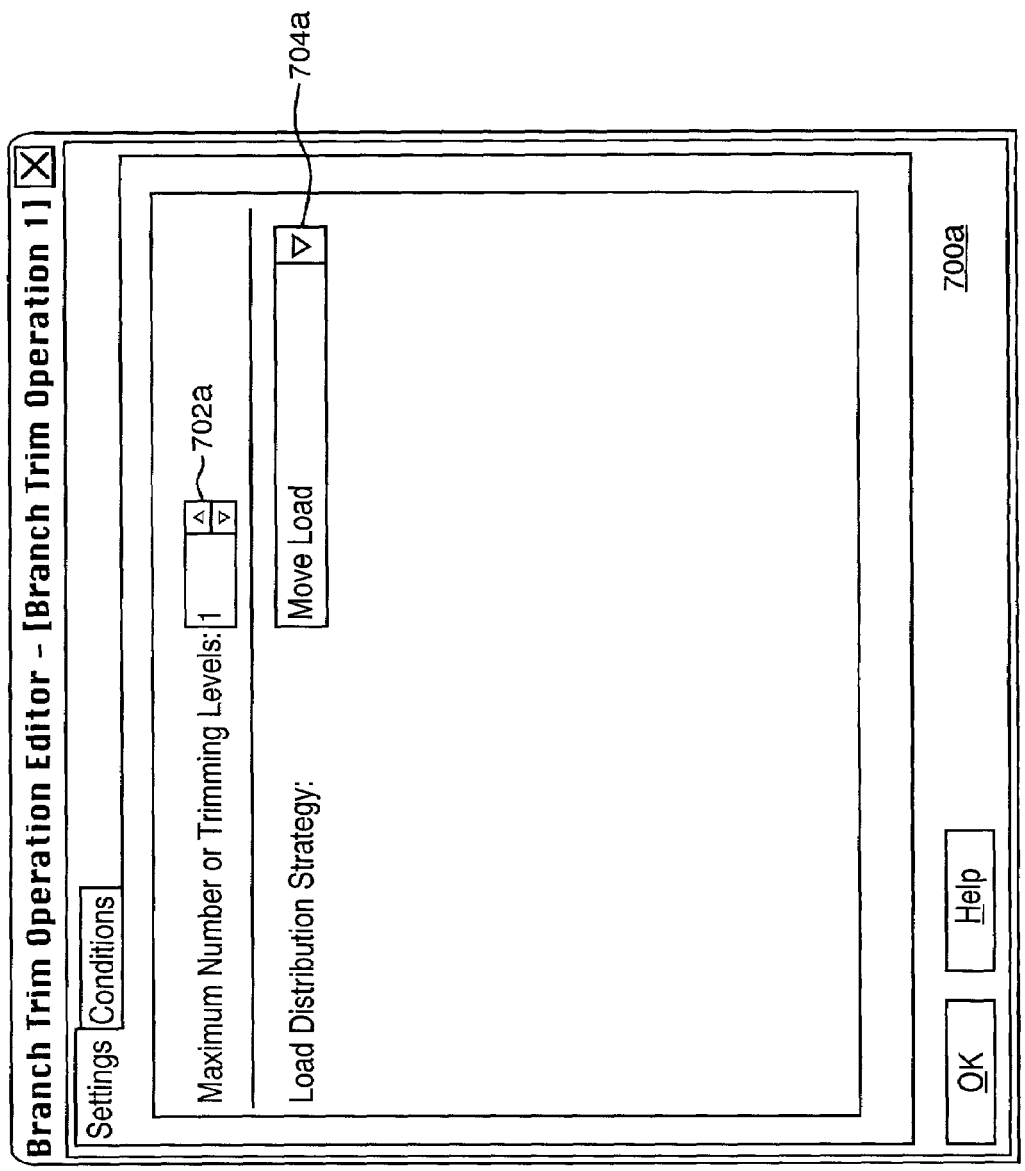
FIG. 7A is a GUI of the Branch Trimming operation editor of the present invention.
Figure 7B:
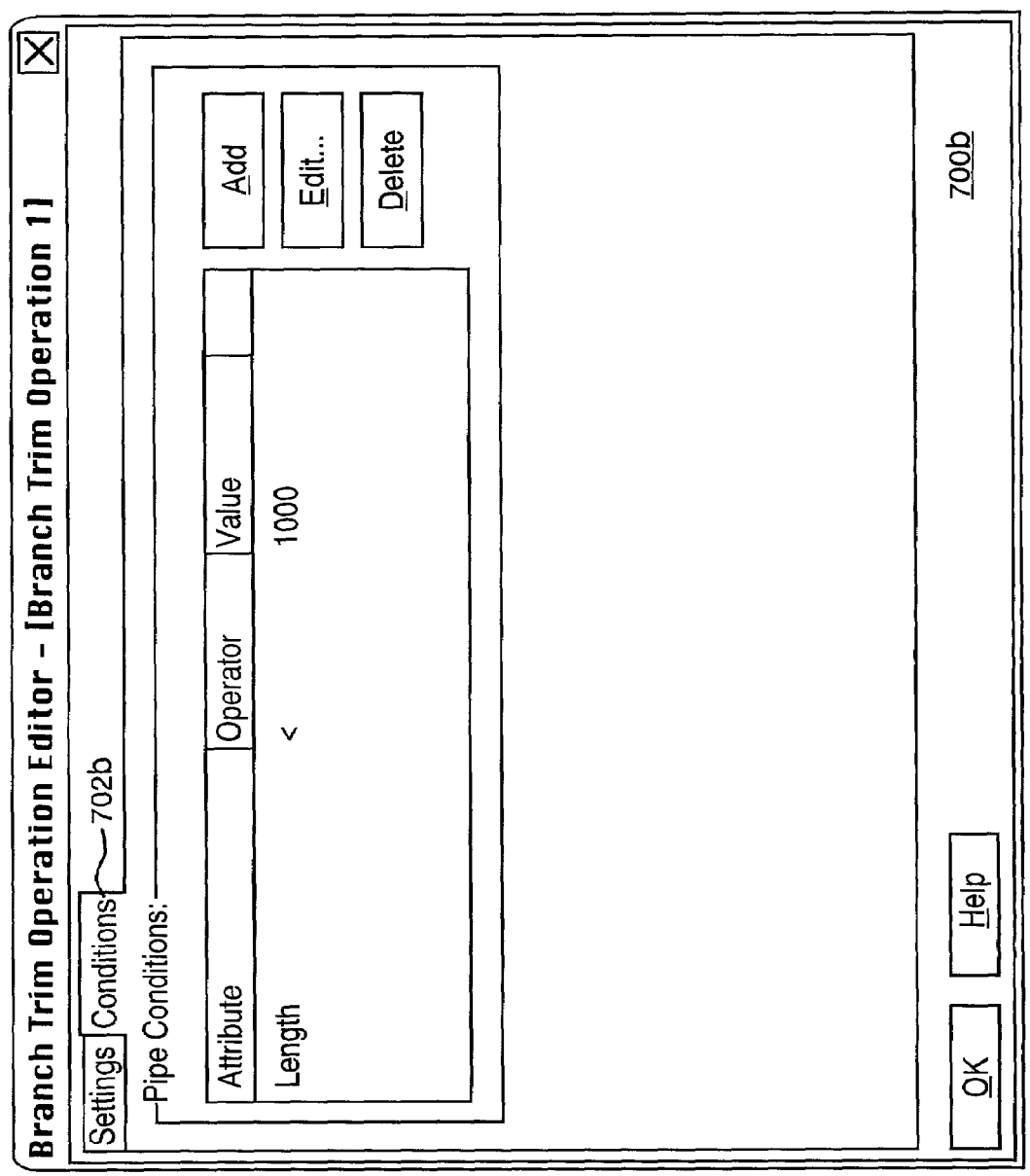
FIG. 7B is a GUI of the conditions tab of the Branch Trimming operation editor.
Figure 8A:
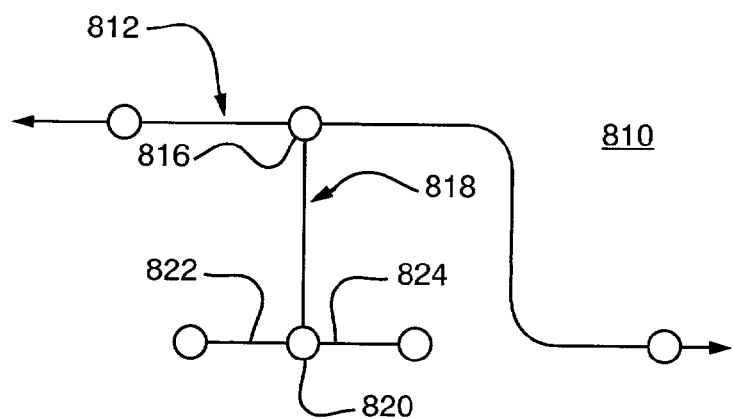
FIGS. 8A through 8C illustrate the Branch Trimming operation.
Figure 8B:
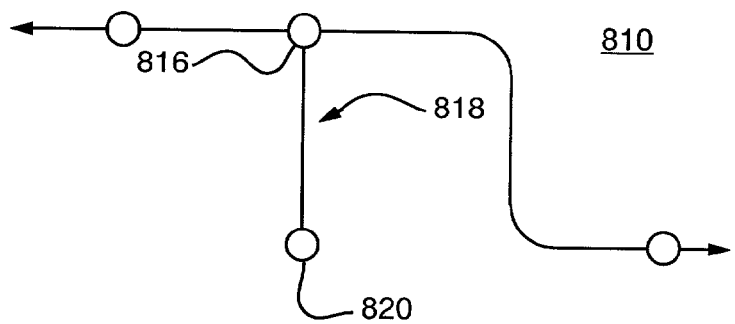
Figure 8C:
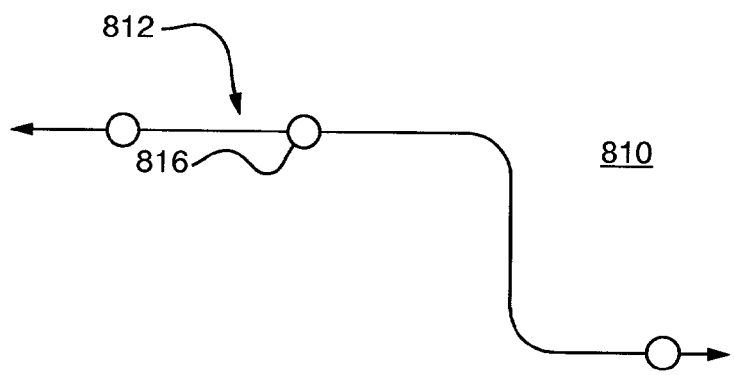

FIG. 7A illustrates the GUI 700a that is the Branch Trimming removal operation editor. Branch Trimming is a technique that is best understood with respect to FIGS. 8A–8C. FIG. 8A illustrates an example of a network portion 810 before Branch Trimming. The network portion has the network of pipes 812, which includes the node 816 and a branch 818. Branch 818 also includes the node 820 and branch portions 822 and 824. As shown in FIG. 8B, the network portion 810 has the branch 818, however, the outgoing portions 822 and 824 have been removed. This represents a first level, or a first pass through the network As illustrated in FIG. 8C, now the branch 818 has been removed and the network portion 810 is all that remains after two Branch Trimming iterations, in which case the branch 818 is completely removed. In accordance with the present invention, the skeletonization Branch Trimming techniques provide a wide range of removal criterion, which increases the advantages provided by this step, and eliminates the need for inefficient manual work arounds. Returning now to FIGS. 7A and 7B, the Branch Trim Operations Editor allows the user to select the number of trimming levels using window 702a, and a load distribution strategy at window 704a (FIG. 7A). In addition, the attribute can be selected using the Conditions tab of the GUI 700b (FIG. 7B) as, for example, the length being less than 1000 feet.

Figure 9A:
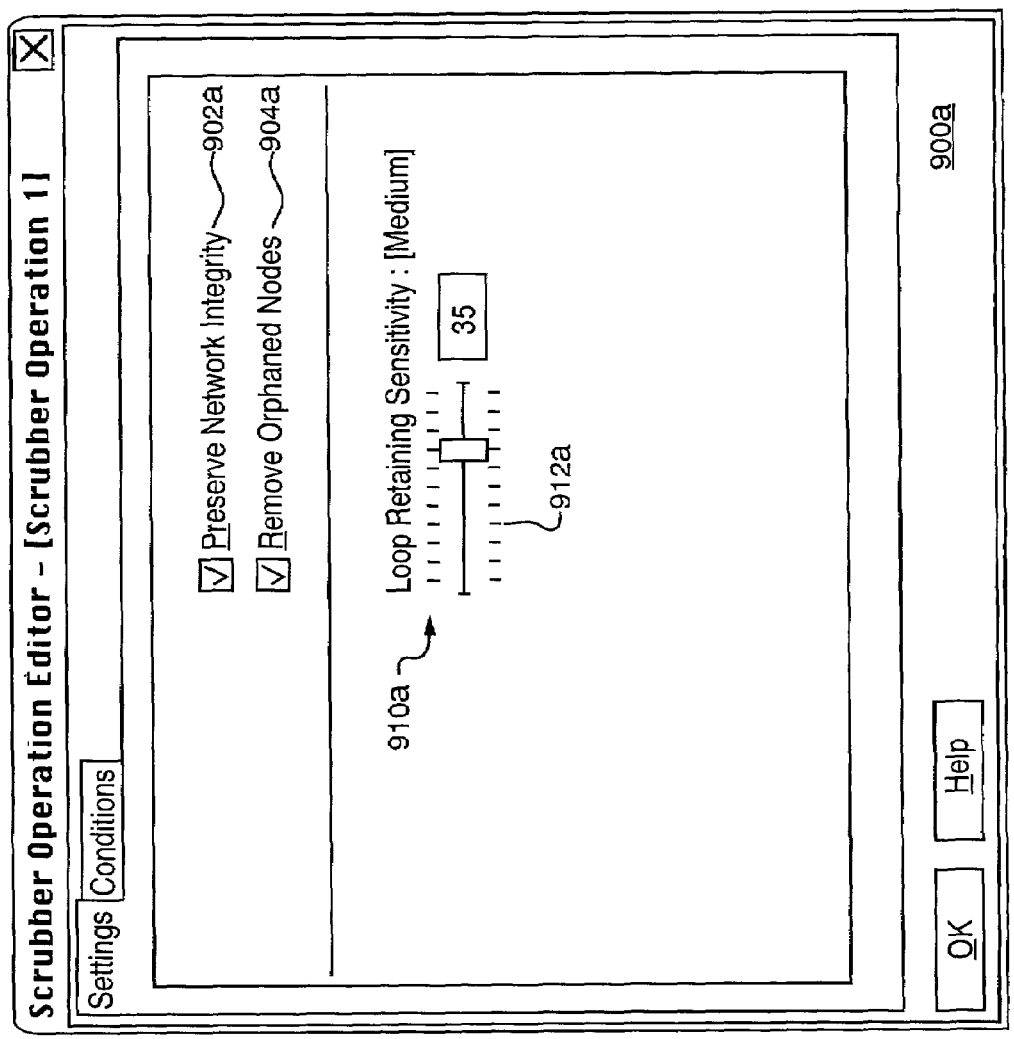
FIG. 9A is a GUI of the Scrubber Operation Editor that includes the loop sensitivity option in accordance with the present invention.
Figure 9B:
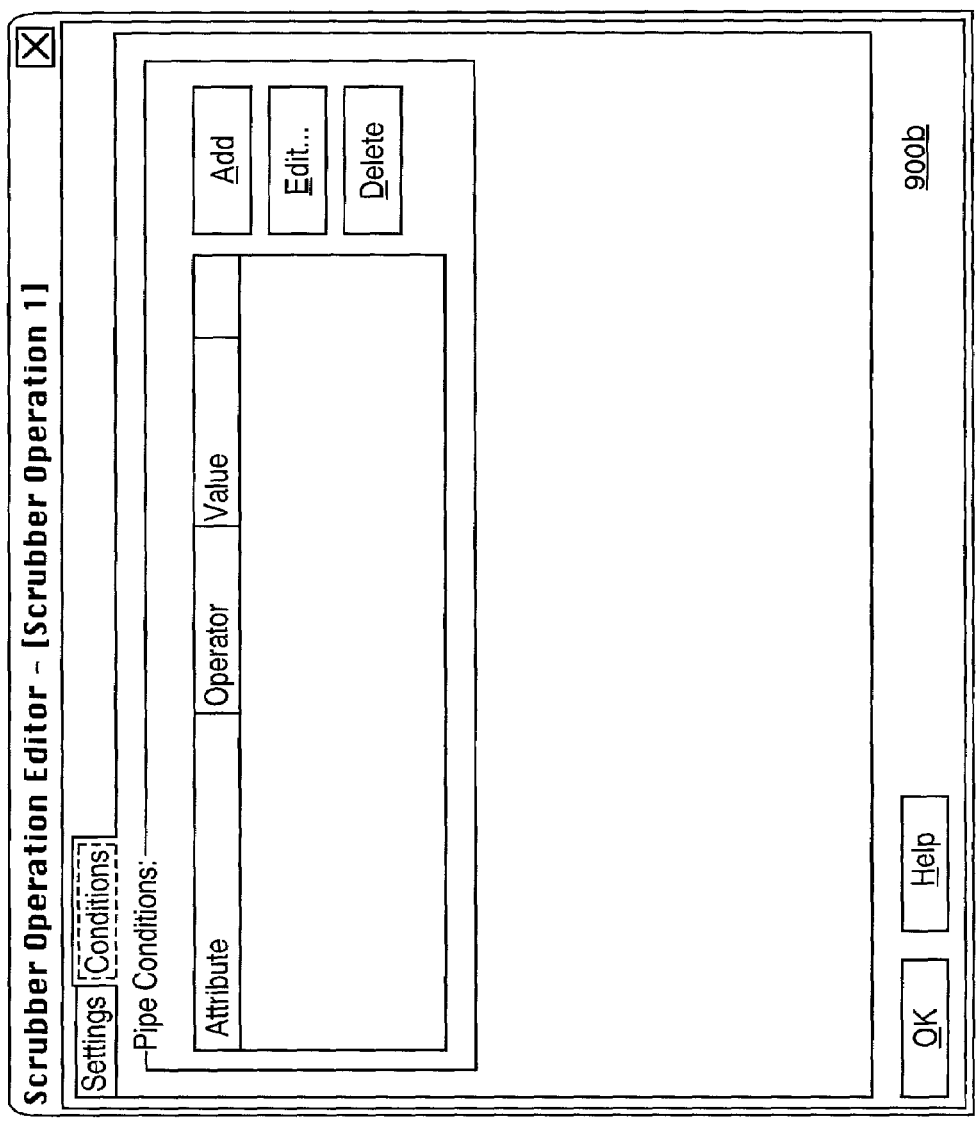
FIG. 9B is a GUI of the conditions tab of the Scrubber Operation Editor.

The GUI 900a of FIG. 9A illustrates the Scrubber Operation Editor of the present invention. Data Scrubbing is often the first step performed in a skeletonization process, particularly when a model is generated with a GIS support program and involves many small segments, which are the result of the digitization process. As noted previously, the disadvantages of standard data scrubbing procedures result from the fact that such procedures do not have awareness of the hydraulic changes caused by removal of the elements from the model, and the effect these changes will have on the calculated results of the network. Data Scrubbing can also cause network disconnections that could lead to a decrease in the accuracy of the simulated network behavior. In accordance with the present invention, this disadvantage is substantially avoided using a network-walking algorithm. The network-walking algorithm on a real time basis (as the removal of one pipe may affect the ability to safely remove the next) determines if pipes are "safe to be removed." That is, it is determined whether the removal of the pipe in question would invalidate or disconnect the network. For example, in order for a pipe to be removed, it should preferably satisfy the following: 1. meet the user-specified removal criteria, 2. be determined as "safe for removal" by the network walking algorithm of the present invention, and 3. not be marked as non-removable by the user in the non-removable elements manager. This added intelligence protects the integrity of the model by eliminating the possibility of inadvertent introduction of errors during the model reduction process that could result from breaking connections in the network. The user can determine the conditions for this aspect of the process by deciding whether to preserve network integrity using check box 902a, in which case the network walking algorithm and topology checking is employed and whether to remove orphaned nodes using box 904a. This feature allows the user to avoid having to delete those junctions manually after the data scrubbing process is complete. In the case in which the user chooses to exercise this option, any demands located on orphaned nodes are relocated to the adjacent end of the pipe that, when removed, will orphan the node, before the removal of that pipe and of the orphaned nodes takes place. Thus, total hydraulic demand of the network is maintained. Conditions can also be set using the attribute feature in the GUI 900b of FIG. 9B.

As alluded to above, certain elements can also be identified as non-removable by the user. The non-removable elements manager for pipes is illustrated in FIG. 10. The GUI 1000 of FIG. 10 shows the window 1002 of removable elements. These are the elements that have not been marked as "non-removable" by the user of the present invention. If desired, the user can thus mark particular elements as non-removable by adding those to the non-removable list in window 1004, thus causing that element to be immune to skeletonization. This can apply to pipes or junctions in the hydraulic example. This feature allows the user to protect elements (pipes/junctions) that should not be removed from the model, e.g. a run of pipe that is used for field tests or other important elements that should not be removed. This is a similar dialog for junctions.

In accordance with the present invention, the scrubber operation editor 900 also includes the loop retaining sensitivity dialog 910a (FIG. 9A). The loop retaining sensitivity feature of the present invention preferably includes a slider 912a. More specifically, the system of the present invention includes a loop retaining sensitivity option, which is a heuristic that determines how sensitive the skeletonization process should be to retaining loops within the network that is being reduced. Adjusting the slider 912a on the dialog 910a to a different sensitivity will result in the Data Scrubbing operation being adjusted. More specifically, the number specified on the slider 912a is a measure of the depth or distance that the network-walking algorithm (that enforces network integrity) will search before making a decision about whether the current pipe can be removed safely or not. It is possible that, if the algorithm looks further than allowed by the sensitivity setting, it might determine that a pipe that is seemingly not safe to remove, is actually safe to remove by discovering (on the wider search) that a larger loop ties both ends of that pipe into the system by other means, at different points. Thus, a further network reduction might be available without destruction of network connectivity.

The loop sensitivity heuristic is designed so that a larger loop retaining sensitivity setting will favor retaining smaller loops in the hydraulic network after skeletonization, and a smaller number (lower sensitivity) will disfavor retaining smaller loops and will retain preferentially larger ones. This can be readily adapted to other types of networks, while remaining within the scope of the present invention.

Figure 11:
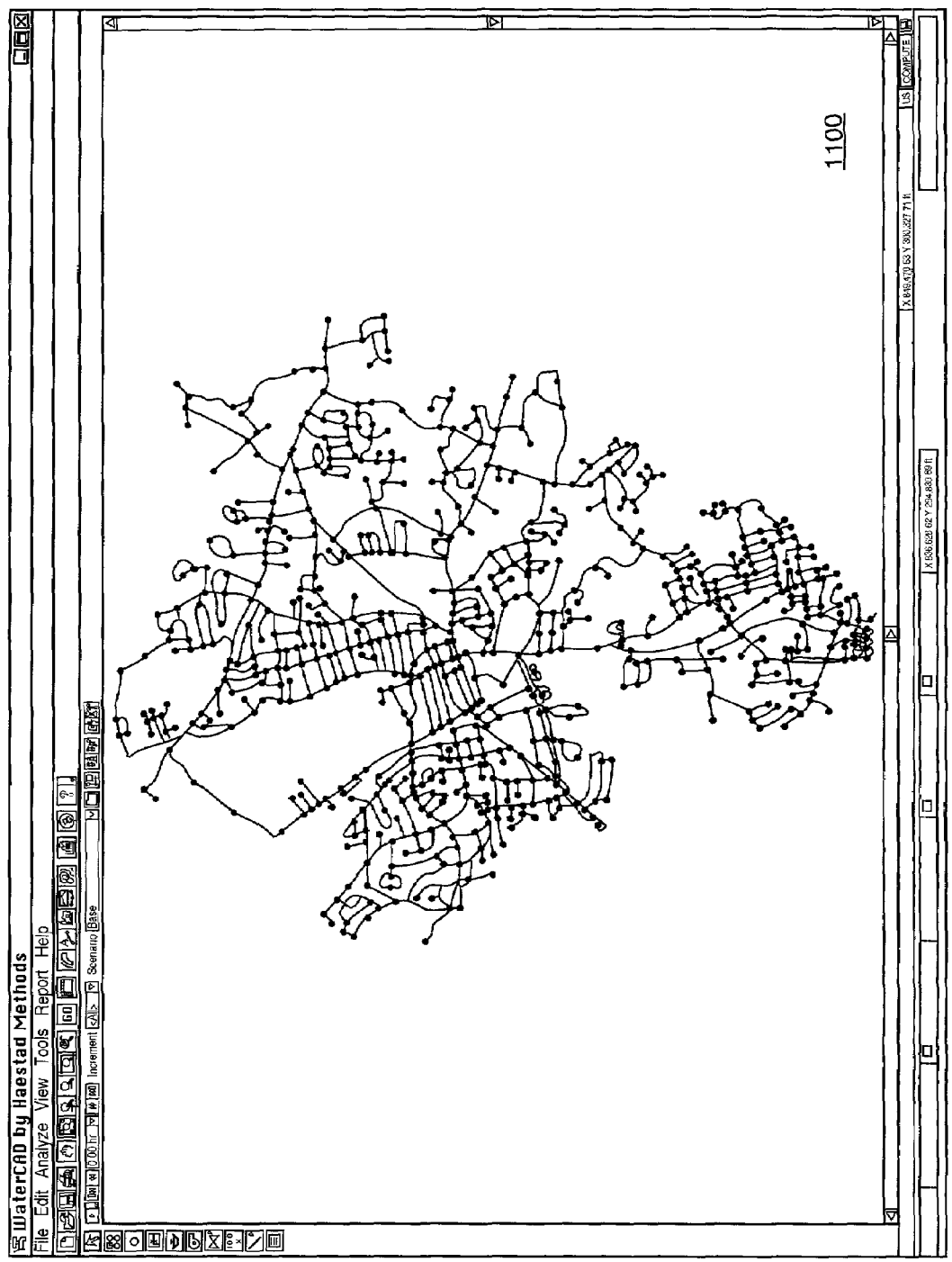
FIG. 11 is a schematic illustration of the display of a hydraulic model prior to being subjected to the data scrubbing skeletonization technique of the present invention.
Figure 12:
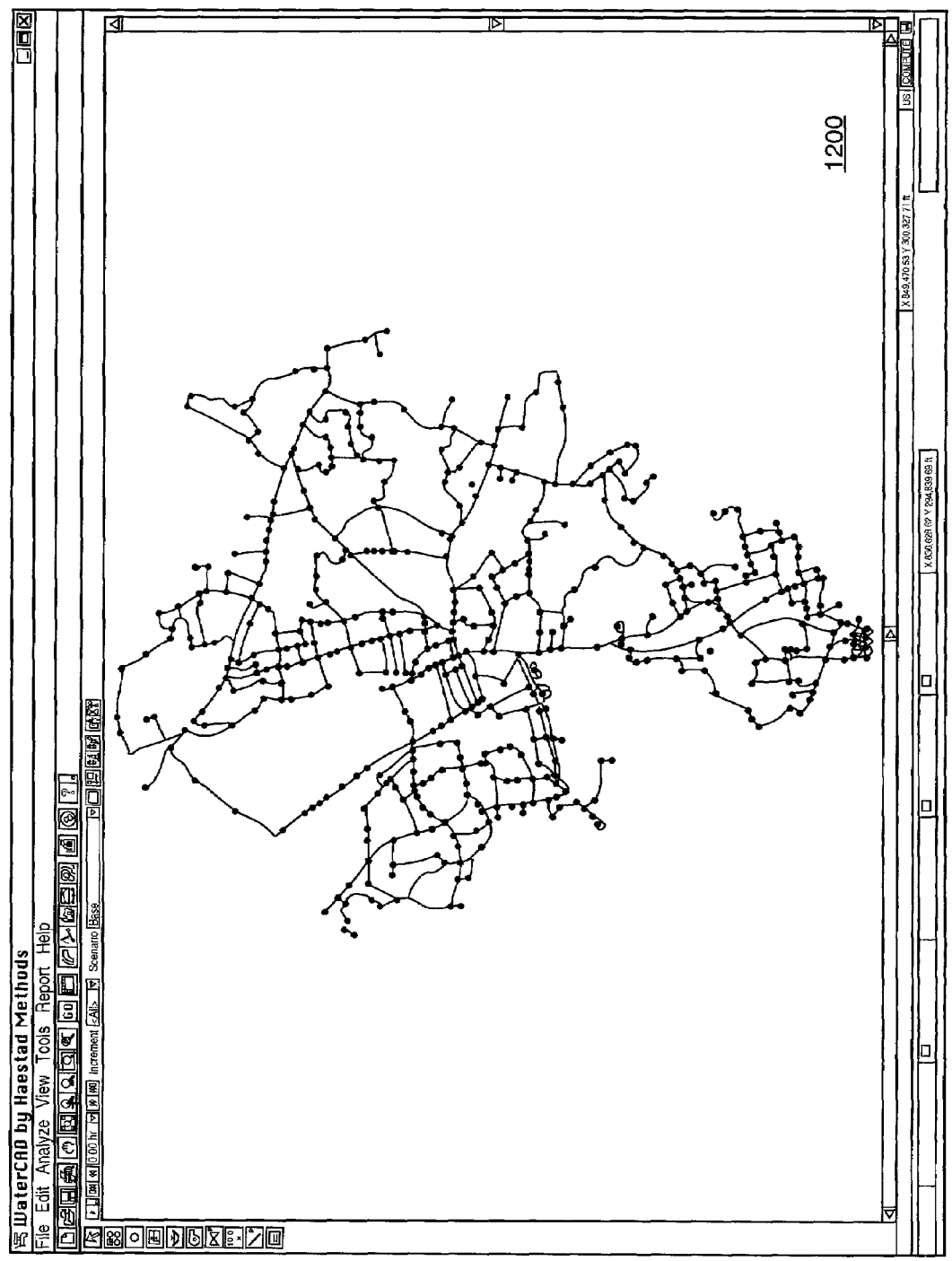
FIG. 12 is a schematic illustration of the display of the hydraulic model results using the data scrubbing skeletonization technique of the present invention using a loop retaining sensitivity setting of 45 (high sensitivity)
Figure 13:
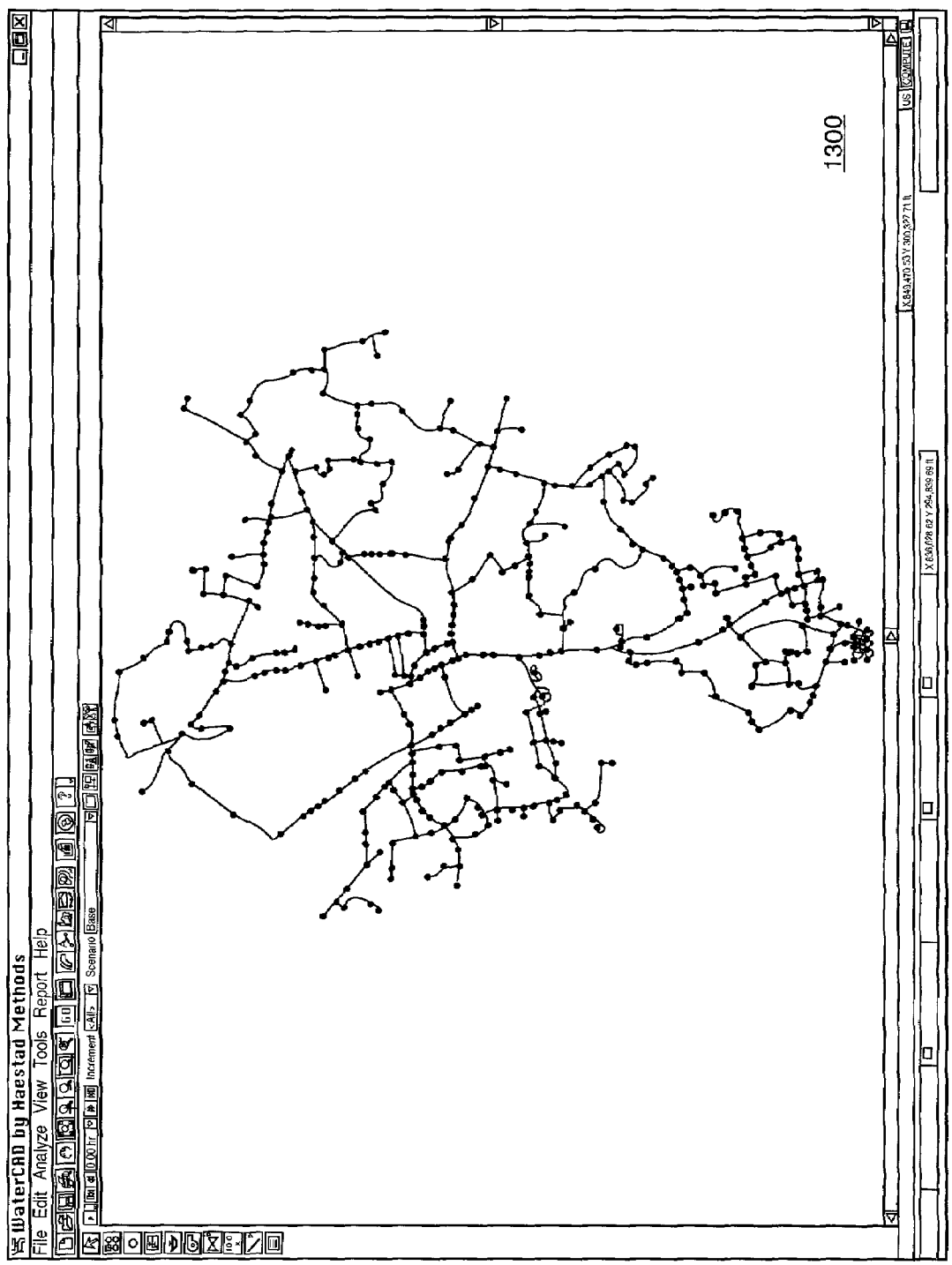
FIG. 13 is a schematic illustration of the display of the hydraulic model results using the data scrubbing skeletonization technique of the present invention using a loop retaining sensitivity setting of 35 (medium sensitivity)
Figure 14:
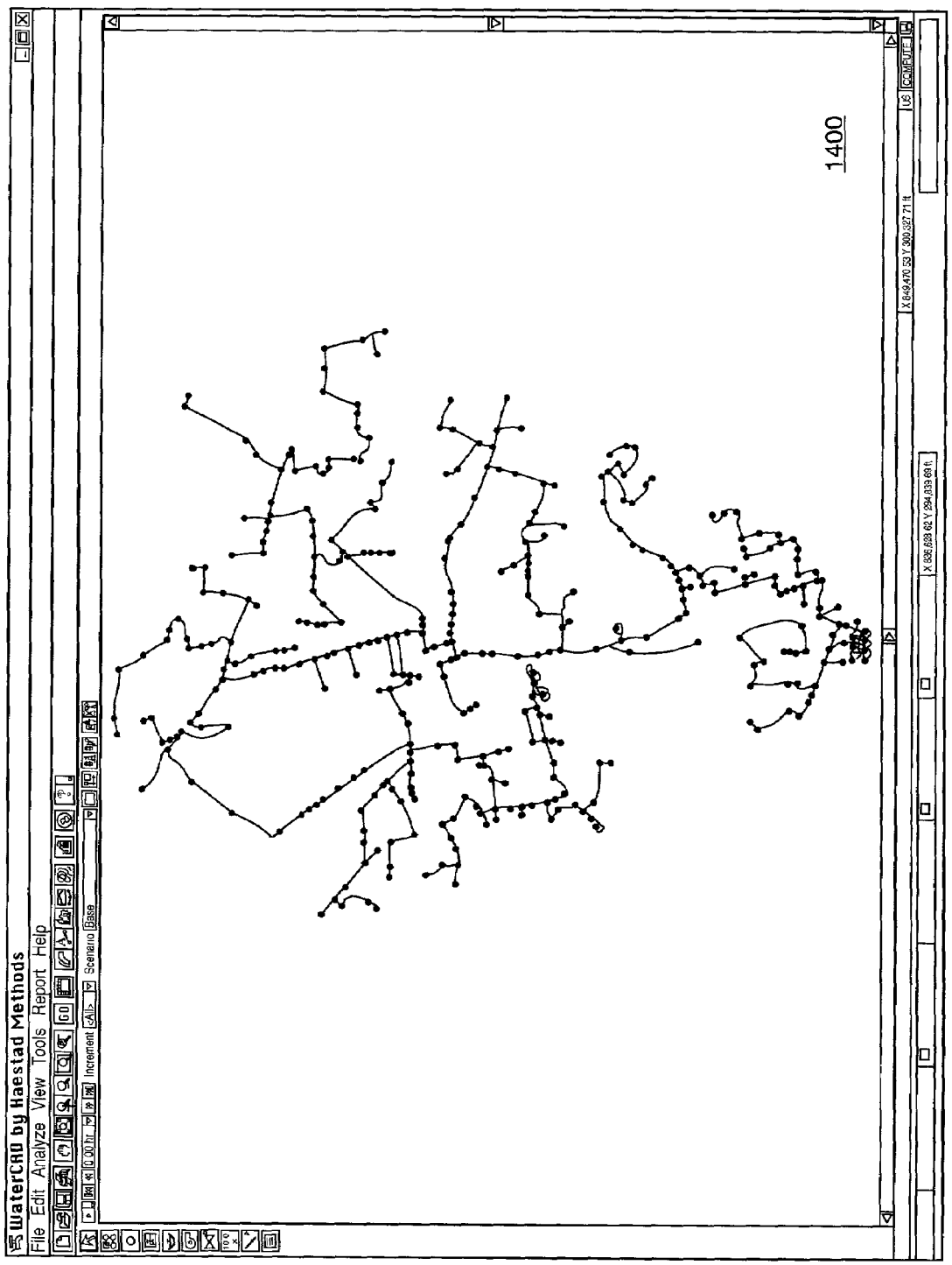
FIG. 14 is a schematic illustration of the display of the hydraulic model results using the data scrubbing skeletonization technique of the present invention using a loop retaining sensitivity setting of 20 (low sensitivity)

The results of various loop sensitivity settings are illustrated in FIGS. 11–14. FIG. 11 is a schematic illustration of the hydraulic network before skeletonization using the Data Scrubbing technique of the present invention. This can be compared with FIG. 12, which is a schematic illustration of the network produced by a model, generated by using Data Scrubbing techniques and loop sensitivity setting 45 (high) in accordance with the heuristic of the present invention. It can be seen that there are fewer loops as the original model, shown in FIG. 11. FIGS. 13 and 14 show the network generated from a model which was solved using loop sensitivity 35 (medium) (FIG. 13) and loop sensitivity 20 (low) (FIG. 14). It is readily apparent that FIG. 14, in which loop sensitivity is 20, allows the elimination of more loops. It is quite apparent that there are less components and less branches than the other loop sensitivities that are higher, however this same general structure of the network is maintained including maintaining hydraulic connectivity to all tank, reservoir, valve and pump elements, thus maintaining hydraulic integrity.

Figure 15A:
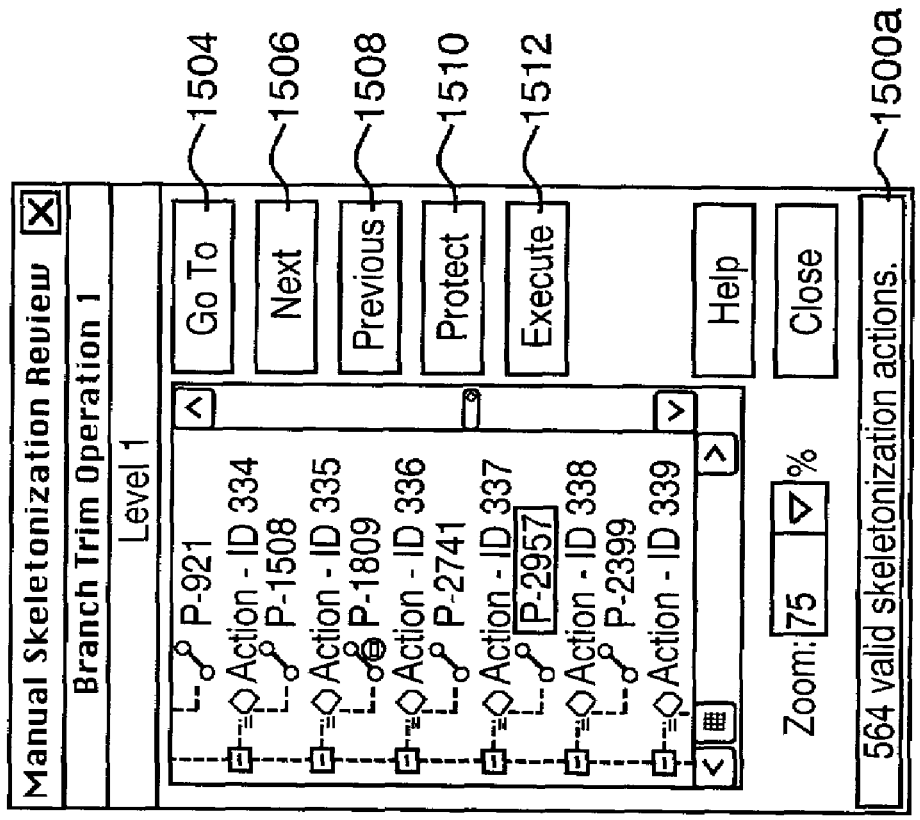
FIG. 15A is a GUI illustrating the manual skeletonization option for all four skeletonization techniques in accordance with the present invention.

Two additional features of the present invention allow the user to customize the skeletonization of an engineering model. For example, in FIG. 15A the GUI 1500a is a manual skeletonization review panel.

Figure 15B:
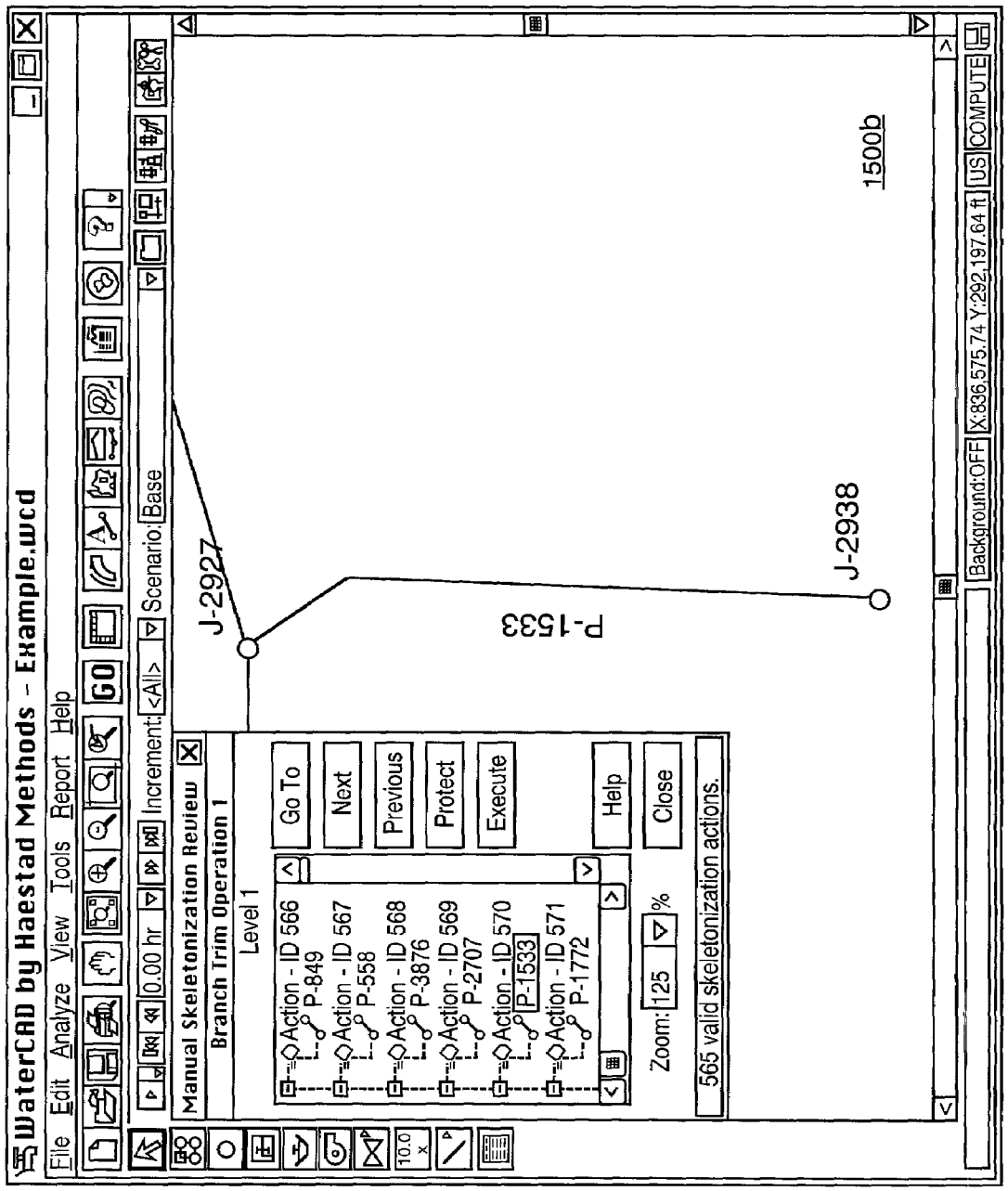
FIG. 15B is a GUI of a portion of the network being examined for manual skeletonization, in accordance with one aspect of the present invention.

For those users that would prefer to spend additional time customizing the system, manual skeletonization can be employed. The portion of the network 1500b to be skeletonized is illustrated in FIG. 15B. The manual skeletonization feature allows a map view of the hydraulic network such as the maps of FIGS. 11–14, with respect to loop sensitivity, but which allow the user to view the hydraulic network that is being skeletonized. The user can activate the buttons 1504–1508 (FIG. 15A) to navigate around the drawing, and if the user is satisfied that a particular pipe or other element should be removed, then the user may click the button "execute" 1512 to remove that element only. Thus, the user can manually skeletonize the model to customize the network to suit the needs of a particular application.

The user also has the ability to protect pipes using the protect button 1510 of the manual skeleton review dialog 1500*a*. The user may determine that certain pipes should be immune to skeletonization for a number of reasons. In the image of 1500*a*, the pipe P-1809 is protected, as evidenced by a small circular icon to the bottom right of the pipe icon. For a particular skeletonization level, there are that many candidate (un-reviewed) actions remaining, as a user goes through the network. The total number remaining in the example of FIG. 15A, as shown at the bottom of the panel is 564. For the case of branch trimming and data scrubbing one pipe is associated with each action. For the case of series and parallel pipe removal two pipes are associated with each action. The skeletonization process builds up a candidate or Action List and then performs those actions. In automatic mode, it runs through this list behind the scenes. In the case of manual skeletonization that Action List is exposed to the user so they can make the decisions to commit each action one by one. Although it can be time consuming, some engineers wish to have this level of control and the present invention provides that control to its users. The bonus for the engineer that wants to spend the time upfront is that the decisions that are made during manual skeletonization (i.e., the elements that cannot be removed that otherwise would have been removed) are able to be saved and reused on future automatic skeletonizations of the same model. This feature, therefore, saves time on future skeletonizations whilst ensuring the same important decisions made in the previously performed manual skeletonization are applied to a new automatic (or manual) skeletonization.

Figure 16:
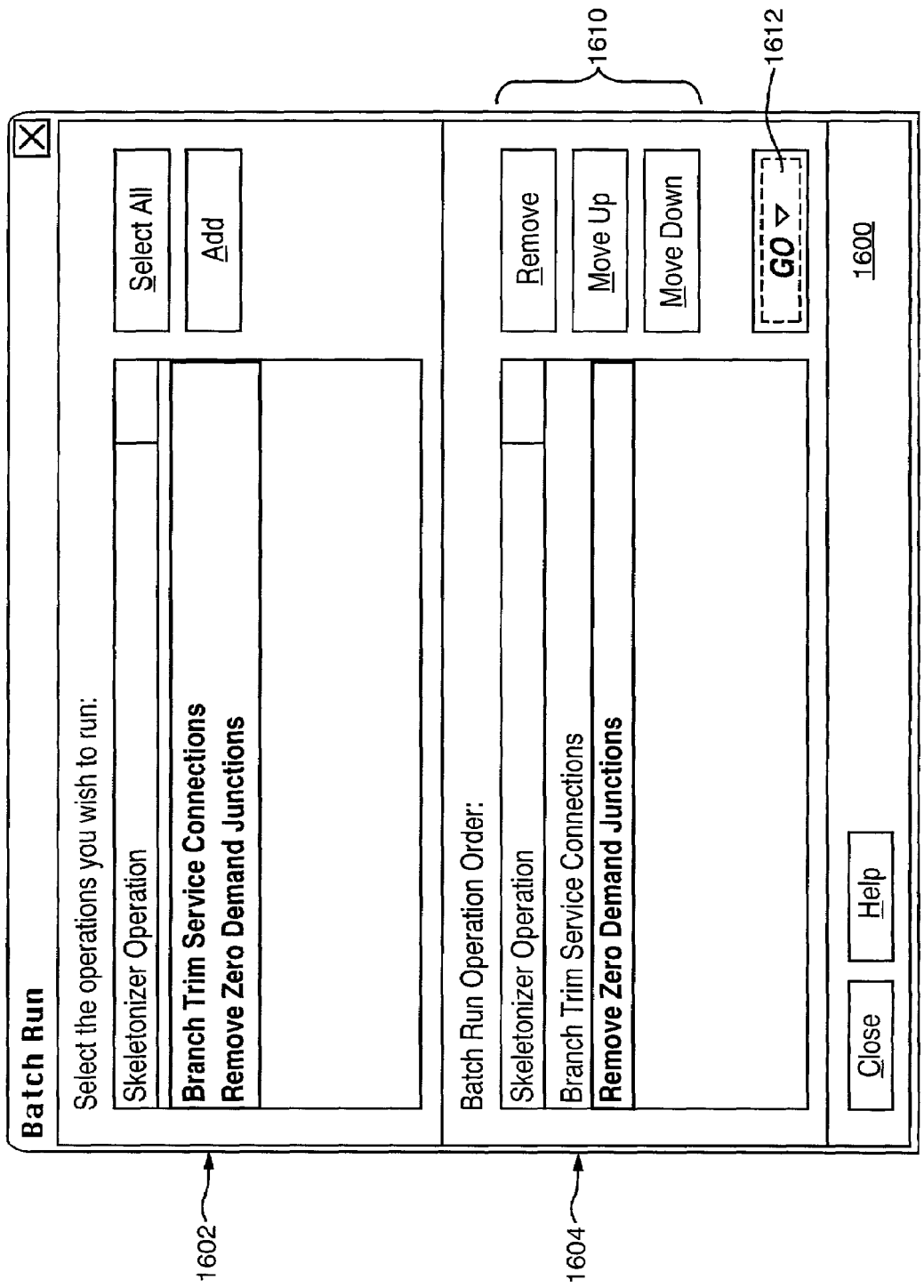
FIG. 16 is the schematic illustration of the batch run feature, in accordance with one embodiment of the present invention.

As noted previously, the present invention includes a batch run GUI 1600 (FIG. 16), which allows a user to select an operation from an available list and add that operation to a batch and a set of procedures is run sequentially, as shown in the list in the window 1602. The Batch Run Operator Order is selected using the window 1604. The skeletonization operation may include Branch Trim Service Connections and Remove Zero Demand Junctions, for example. The order of the operations can be changed using the buttons identified collectively by the reference character 1610. The batch can then be run automatically or previewed using a menu that is displayed by clicking the "GO" button 1612. This batch run dialog allows the user to select any operations that has previously been defined to queue up for running as a batch.

When reducing network topology-based systems, as noted herein, some of the network hydraulic behavior of the system can be affected by the removal of elements, and this can compromise the accuracy of the model. In such a case, the network may not validly simulate the actual system. This is most typically an issue with techniques like Data Scrubbing. In accordance with the present invention, Branch Trimming, Series Pipe Removal and Parallel Pipe Removal techniques typically do not have discernable effects on hydraulics due to the unique hydraulic equivalency feature of the present invention, as described herein. Using a Data Scrubbing technique, however, link and node removal is somewhat blind in terms of hydraulics, which can result in a certain loss of the hydraulic effect of those elements in the model of the system. In other words, Data Scrubbing can be a more destructive process to the model than the other techniques. However, as noted, the state of the model, such as that produced in the GIS environment, might render itself most amenable to a Data Scrubbing technique in which case it is still desirable to use that technique.

Therefore, in accordance with the present invention, an additional technique after Data Scrubbing is employed, is used to re-instate the hydraulic effects for the adjusted network model. The system includes a software program that employs a genetic algorithm to evolve solutions for reinstating the behavior of the original network into a simplified network. The genetic algorithm can be used for identifying the less sensitive hydraulic elements (links and nodes), and removing them or replacing them with the best-fit element parameters produced by the genetic algorithm module of the present invention. An alternative aspect of the invention includes using an element-by-element skeletonization approach to generate the layout of a skeleton network and then identifying potential equivalent elements for replacing series pipes and loops, using the method of the present invention and using the techniques of the present invention to optimize the demand distribution and pipe conductance of the skeletonized model.

In addition, the method of the present invention includes optimizing the layout of a simplified model by identifying and removing the elements that have the least influence on the system hydraulic response, and optimizing the demand distribution, and optimizing the pipe conductance, which as used herein includes a combination of pipe roughness and pipe diameter.

These aspects of the invention have been described in commonly owned U.S. Provisional Patent Application Ser. No. 60/388,391, filed on Jun. 13, 2002 for a TECHNIQUE FOR OPTIMIZATION OF A SIMPLIFIED NETWORK MODEL.

Figure 17:
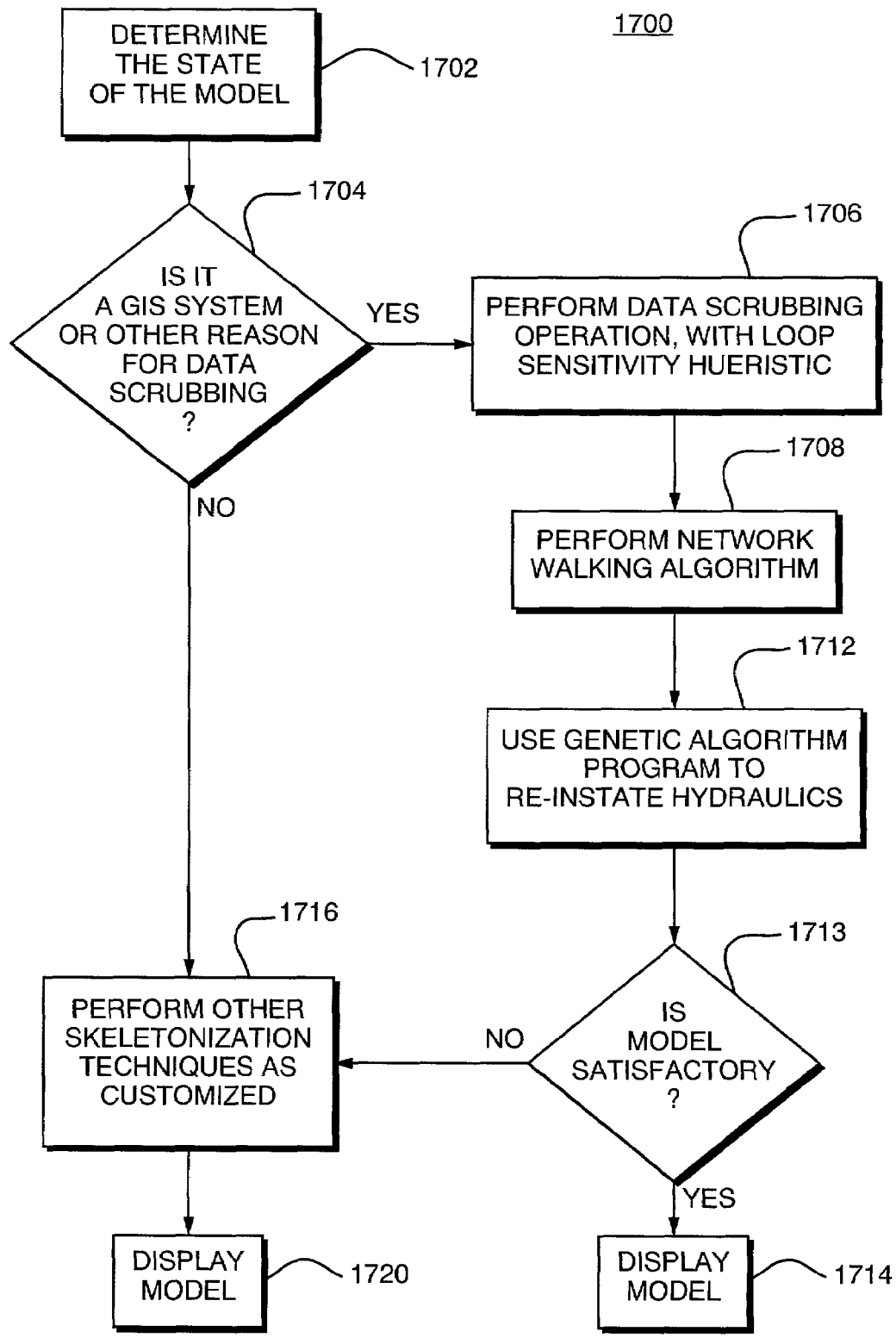
FIG. 17 is a flow chart illustrating a procedure in accordance with the method of the present invention.

This method of the present invention can be more readily understood with respect to FIG. 17, which is a flow chart illustrating the procedure in accordance with the present invention. As shown in FIG. 17, the procedure starts with determining the state of the model 1702. As noted herein before, a model produced in a GIS environment will have many small elements that result from the digitization process. Thus, data scrubbing is most likely the initial technique to be performed. The procedure proceeds to perform a data scrubbing task, as illustrated in 1706. As part of the data scrubbing process, the loop sensitivity setting is checked, and the appropriate loops are removed. A branch-walking step, 1708 is then performed to ascertain that elements to be removed are safe to remove, or are marked non-removable. Steps 1706 and 1708 can occur simultaneously but are mentioned separately for purposes of illustration.

Once the data scrubbing is completed, the model is subjected to the genetic algorithm techniques described herein, as shown in 1712 to re-introduce the hydraulics to the model, and to optimize the model. If this model represents the network in a manner that is satisfactory to the end user, then that network model can be displayed or the results otherwise produced in a manner selected by the user, as illustrated in step 1714. If the data scrubbing is performed and it is determined that additional skeletonization is desired (this decision is illustrated in decision step 1713), then the procedure will continue with one or more other operations, such as branch trimming, Series Pipe Removal or parallel pipe removal, as illustrated in 1716. The model is thus reduced, and displayed to the end user, as shown in step 1720.

It should be understood that the skeletonization and reduction techniques of the present invention have provided solutions over the prior art and have many advantages in including providing the user with versatility in customizing the skeletonization process, and improving level of control by using loop sensitivity settings, increasing the scope of skeletonization by using flexible criteria and tolerances, and significantly improving the results obtained by the skeletonization through hydraulically equivalent pipe techniques and network integrity aware algorithms. The latter point leads to significant time savings by avoiding otherwise inevitable corrections and adjustments that are required to fix problems created in the absence of these features. The genetic algorithm-based feature results in a model that has been reduced in accordance with an engineering modeler's criterion, but which results in an engineering model that is optimized and accurately reflects system behavior when subject to a normally destructive data scrubbing technique.

The foregoing description has been directed to specific embodiments of the invention. It will be apparent, however, that other variations and modifications may be made to the described embodiments, with the attainment of some or all of the advantages of such. Therefore, it is the object of the appended claims to cover all such variations and modifications as come within the true spirit and scope of the invention.

What is claimed is:

1. A method of performing model reduction for a water distribution model containing multiple elements representing physical components of a water distribution system, the method comprising the steps of:
    performing a reduction in the number of elements in the model using one or more skeletonization techniques, including data scrubbing; and
    re-instating network behavior including calibrating the model using a genetic algorithm after the reduction step with one or more selected parameters and boundary conditions to provide an accurate representation of the system at a selected instant in time.

2. The method as defined in claim 1 wherein said data scrubbing is enhanced by a network integrity preservation step that includes performing a loop sensitivity heuristic.

3. The method as defined in claim 2 wherein said loop sensitivity heuristic is user defined.

4. The method as defined in claim 1 wherein said calibrating step includes using a genetic algorithm based calibration program.

5. The method as defined in claim 1 including setting criteria and tolerances for at least one of the skeletonization techniques.

6. The method as defined in claim 1 including the further step of defining certain elements as non-removable.

7. A system for providing a model reduction for a water distribution system model, comprising:
    a hydraulic simulation module configured to generate a model of the system being described;
    a skeletonization module configured to reduce the number of elements in the model generated by said hydraulic simulation module;
    a calibration module configured to cooperate with said skeletonization module to adjust the model to reinstate network behavior after reduction of the model; and
    a genetic algorithm module which cooperates with said calibration module to optimize the reinstated network behavior in the model.

8. The system as defined in claim 7 further comprising a component object model that is coupled to said hydraulic simulation module and that is configured to provide programmic access to data stored in an associated database which includes information about the network being modeled.

9. A system as described in claim 7 wherein said skeletonization module comprises a skeletonization manager configured to allow a user to manage model reduction, and a non-removable element manager configured to allow a user to select certain elements as non-removable.

10. The system as described in claim 9 wherein said hydraulic simulation module includes a hydraulic network solver engine that produces an engineering model in accordance with specification selected by the user.

11. The system as described in claim 8 including one or more graphic user interfaces allowing an end user to interface with the system.

12. The system as described in claim 8 further comprising a GIS client configured to generate a topological representation of the hydraulic network model.

13. The system as defined in claim 9 wherein said skeletonization manager is configured to allow a user to select one or more of the following skeletonization operations:
    data scrubbing, branch trimming, series pipe removal and parallel pipe removal.

14. The system as defined in 13 wherein said series pipe removal operation is configured to determine a combination of pipe attributes that most closely mimics hydraulic behavior of pipes to be merged and to apply selected attributes to a newly merged pipe to generate an equivalent pipe from two non-identical pipes.

15. The system as defined in claim 13 wherein a data scrubbing operation is selected and is configured to determine whether a pipe to be removed satisfies one or more of the following:
    meets user specified removal criteria;
    is determined as safe for removal by a network walking algorithm; and
    is not marked as non-removable in the non-removable elements manager.

16. The system as defined in claim 15 wherein the model was generated using a GIS support program.

17. The system as defined in claim 7 further comprising a loop retaining sensitivity option which includes a heuristic that determines the sensitivity of skeletonization process when retaining loops within the network that is being reduced.

18. The system as defined in claim 7 wherein said genetic algorithm module is configured to evolve solutions for re-instating behavior of an original network into a simplified network.

19. The system as defined in claim 18 wherein said genetic algorithm module is further configured to identify less sensitive hydraulic elements and to remove said less sensitive hydraulic elements or to replace said less sensitive hydraulic elements with a best fit element parameter produced by the genetic algorithm module.

20. A computer readable medium containing executable program instructions for developing and skeletonizing an engineering model, the executable program instructions comprising program instructions for performing the steps of:
    generating a model of an engineering system, using an object model and an associated database;
    determining whether the model is produced in a GIS environment;
    if a model is produced in a GIS environment, reducing the model by performing a data scrubbing task;
    selecting a loop sensitivity setting;
    removing those loops that fall within a selected loop sensitivity setting;
    performing a branch walking step to ascertain elements to be removed or to mark element as non-removable;

performing genetic algorithm techniques to re-introduce the hydraulics to the model after model reduction and to optimize the model; and display the results of the model.

21. The method as defined in claim 20 including determining that additional reduction is to be performed and further reducing the model using one or more skeletonization operations including branch trimming, series pipe removal and parallel pipe removal.

22. The method as defined in claim 20 including further program instructions for optimizing the layout of a simplified model by identifying and removing elements that have the least influence on the system hydraulic response.

23. The method as defined in claim 20 including further program instructions for optimizing the demand distribution of the network being modeled.

24. The method as defined in 20 wherein pipe conductance is being determined, including the further step of optimizing pipe conductance using information about one or more attributes including pipe roughness and pipe diameter.

\* \* \* \* \*